(12) United States Patent
Liu et al.

(10) Patent No.: US 11,944,982 B2
(45) Date of Patent: Apr. 2, 2024

(54) POLYMER-FUNCTIONALIZED MAGNETIC PARTICLE EMBODIMENTS FOR SOLUTE SEPARATION, AND DEVICES AND SYSTEMS FOR USING THE SAME

(71) Applicant: Battelle Memorial Institute, Richland, WA (US)

(72) Inventors: Jian Liu, Richland, WA (US); B. Peter McGrail, Pasco, WA (US); Satish Nune, Richland, WA (US); Praveen Thallapally, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 368 days.

(21) Appl. No.: 16/741,388

(22) Filed: Jan. 13, 2020

(65) Prior Publication Data
US 2020/0384480 A1 Dec. 10, 2020

Related U.S. Application Data

(60) Provisional application No. 62/857,631, filed on Jun. 5, 2019.

(51) Int. Cl.
*B03C 1/30* (2006.01)
*B01D 15/00* (2006.01)
(Continued)

(52) U.S. Cl.
CPC .............. *B03C 1/30* (2013.01); *B01D 15/203* (2013.01); *B03C 1/01* (2013.01); *B03C 1/0335* (2013.01);
(Continued)

(58) Field of Classification Search
None
See application file for complete search history.

(56) References Cited

U.S. PATENT DOCUMENTS

| | | |
|---|---|---|
| 2007/0189986 A1 | 8/2007 | Wang et al. |
| 2010/0006509 A1 | 1/2010 | Hornes |

(Continued)

FOREIGN PATENT DOCUMENTS

| | | |
|---|---|---|
| CN | 105142729 | 12/2015 |
| CN | 109232907 A * | 1/2019 |

(Continued)

OTHER PUBLICATIONS

He et al., Microwave assisted magnetic solid phase extraction using a novel amino-functionalized magnetic framework composite of type Fe3O4—NH2@MIL-101(Cr) for the determination of organochlorine pesticides in soil samples, Talanta, pp. 572-578, Available online Dec. 10, 2018. (Year: 2018).*

(Continued)

*Primary Examiner* — Clare M Perrin
(74) *Attorney, Agent, or Firm* — Klarquist Sparkman LLP

(57) ABSTRACT

Disclosed herein are embodiments of a polymer-functionalized particle for using in isolating and extracting solutes, such as rare earth metals, lithium, and the like. The polymer-functionalized particles exhibit strong resistance to agglomeration and degradation even in high ionic strength and/or temperature environments. A post-particle synthesis method for making the polymer-functionalized particle is disclosed, along with a magnetic separation device and that can be used in system embodiments to facilitate use and regeneration of the polymer-functionalized particles in solute extraction.

15 Claims, 11 Drawing Sheets

(51) Int. Cl.

| | | |
|---|---|---|
| *B01D 15/20* | (2006.01) | |
| *B03C 1/01* | (2006.01) | |
| *B03C 1/033* | (2006.01) | |
| *B03C 1/28* | (2006.01) | |
| *C08F 28/02* | (2006.01) | |
| *C08F 128/02* | (2006.01) | |
| *C08G 73/02* | (2006.01) | |
| *H01F 1/00* | (2006.01) | |
| *H01F 1/047* | (2006.01) | |
| *H01F 1/113* | (2006.01) | |

(52) U.S. Cl.
CPC .............. *B03C 1/288* (2013.01); *C08F 28/02* (2013.01); *C08F 128/02* (2013.01); *C08G 73/0206* (2013.01); *H01F 1/0054* (2013.01); *H01F 1/047* (2013.01); *H01F 1/113* (2013.01); *B03C 2201/18* (2013.01); *B03C 2201/20* (2013.01)

(56) References Cited

U.S. PATENT DOCUMENTS

| | | |
|---|---|---|
| 2012/0043495 A1 | 2/2012 | Gangopadhyay et al. |
| 2012/0135080 A1* | 5/2012 | Bromberg ............... B03C 1/015 977/773 |
| 2014/0042068 A1* | 2/2014 | Namiki .............. B01J 20/28009 427/127 |
| 2015/0268370 A1 | 9/2015 | Johnston et al. |
| 2017/0128952 A1 | 5/2017 | Oki et al. |
| 2017/0304796 A1 | 10/2017 | Duan et al. |

FOREIGN PATENT DOCUMENTS

| | | |
|---|---|---|
| JP | 04317706 | 11/1992 |
| RO | 112090 | 5/1997 |
| RO | 114953 | 9/1999 |
| WO | WO2020131964 A1 | 6/2020 |

OTHER PUBLICATIONS

Falcaro et al. (Ad. Mater., 2011, 23, 3901-3906). (Year: 2011).*
Zhang et al. (Journal of Hazardous Materials, 2011, 186, 984-990). (Year: 2011).*
Faustini et al. (J. Am. Chem. Soc., 2013, 135, 14619-14626). (Year: 2013).*
Ricco et al. (J. Mater. Chem. A, 2013, 1, 13033-13045). (Year: 2013).*
Nejashafiee et al. (Materials Science & Engineering C, 2019, 99, 805-815). (Year: 2019).*
Tregubov et al. (Journal of Magnetism and Magnetic Materials, 2018, 449, 590-596). (Year: 2018).*
Machine translation of CN 109232907A, pp. 1-9. (Year: 2019).*
International Search Report and Written Opinion issued for International Application No. PCT/US2020021507 dated Aug. 7, 2020.
Golas et al., "Comparative study of polymeric stabilizers for magnetic nanoparticles using ATRP," *Langmuir*, 26(22): 16890-16900, Oct. 14, 2010.
Iqbal et al., "Colloids and surfaces A: physicochemical and engineering aspects," *Colloids and Surfaces A: Physicochem. Eng. Aspects*, vol. 520, pp. 257-267, Jan. 29, 2017.
Kwon et al., "Tunable nanoparticle stability in concentrated polymer solutions on the basis of the temperature dependent solvent quality," *Macromolecules*, vol. 49, pp. 2307-2317, Mar. 11, 2016.
Lazaro et al., "Selective surface PEGylation of UiO-66 nanoparticles for enhanced stability, cell uptake, and pH-responsive drug delivery," *Chem*, vol. 2, pp. 561-578, Apr. 13, 2017.
McGrail et al., "Magnetic partitioning nanofluid for rare earth extraction from geothermal fluids," available at https://www.pnnl.gov/main/publications/external/technical_reports/PNNL-26721.pdf, Aug. 2017.
Zimpel et al., "Imparting functionality to MOF nanoparticles by external surface selective covalent attachment of polymers," *Chemistry of Materials*, vol. 28, pp. 3318-3326, Apr. 28, 2016.
Communication with Partial Supplementary European Search Report issued for EP Application No. 20818740.1 dated Jun. 6, 2023.
Nejadshafiee et al., "Magnetic bio-metal-organic framework nanocomposites decorated with folic acid conjugated chitosan as a promising biocompatible targeted theranostic system for cancer treatment," *Materials Science & Engineering C* 99:805-815, 2019.
Tregubov et al., "Magnetic hybrid magnetite/metal organic framework nanoparticles: facile preparation, post-synthetic biofunctionalization and tracking in vivo with magnetic methods," *Journal of Magnetism and Magnetic Materials* 449:590-596, 2018.
Office Action issued for Saudi Arabian Application No. 521431017 dated Jul. 31, 2023.
Office Action issued for Chilean Application No. 202103216 dated Jun. 19, 2023.
Cutsanu et al., "Iron(III) states in 4-vinylpyridine: Divinylbenzene copolymer modified by monochloracetic and acrylic acids," *Reactive & Functional Polymers* 40:123-128, 1999.
Extended European Search Report dated Sep. 4, 2023 from European Application No. EP20818740.1 (19 pages).
Giaveno et al., "Biological ferrous sulfate oxidation by *A. ferrooxidans* immobilized on chitosan beads," *Journal of Microbiological Methods* 72:227-234, 2008.
Najorka et al., "Single-crystal X-ray diffraction study of synthetic sodium-hydronium jarosite," *Physical and Chemistry of Materials* 43:377-386, 2016.
Qi et al., "Adsorption combined with superconducting high gradient magnetic separation technique used for removal of arsenic and antimony," *Journal of Hazardous Materials* 343:36-48, 2018.

* cited by examiner

POLYMER-FUNCTIONALIZED MAGNETIC PARTICLE EMBODIMENTS FOR SOLUTE SEPARATION, AND DEVICES AND SYSTEMS FOR USING THE SAME

CROSS REFERENCE TO RELATED APPLICATION

This application claims the benefit of and priority to the earlier filing date of U.S. Provisional Application No. 62/857,631, filed on Jun. 5, 2019; the entirety of which is incorporated herein by reference.

ACKNOWLEDGMENT OF GOVERNMENT SUPPORT

This invention was made with Government support under Contract DE-AC05-76RL01830 awarded by the U.S. Department of Energy. The Government has certain rights in the invention.

FIELD

Disclosed herein are embodiments of polymer-functionalized particles for separating and isolating solutes from complex mixtures, devices for solute separation/isolation, and methods of making and using polymer-functionalized particle and device embodiments.

BACKGROUND

Nanoparticles play an important role in wide range of applications including enhanced oil recovery, drug delivery, subsurface imaging and critical metal extraction. Strong colloidal dispersion stability, and endurance in high ionic strength solutions are two primary pre-requirements for their use in these applications. However, active functional nanoparticles with high selectivity and capacities often suffer from uncontrolled aggregation under saline environments particularly at high temperatures leading to dramatic reduction in the overall performance. Enhancing or increasing nanoparticle colloidal stability in high ionic strength solutions and at high temperature still remains a grand challenge because grafting of nanoparticles with components to increase steric repulsion often results in reduced nanoparticle performance. Also, current devices and/or systems used for extracting solutes, such as rare earth elements ("REEs"), from sources containing such solutes are limited in terms of scale of operation and productivity (in terms of how much of the REEs can actually be isolated).

There exists a need in the art for particle-based tools that are capable of extracting solutes, particularly particles that have improved colloidal stability in different environments, as well as scalable systems and methods for using such particles to extract solutes from such sources (e.g., geothermal fluids, produced waters from oil & gas extraction, discharges from mining and processing of mined hard rock minerals, concentrate discharge from desalination, glacial runoff, and other similar sources).

SUMMARY

Disclosed herein are embodiments of a polymer-functionalized particle. In some embodiments, the polymer-functionalized particle can comprise a magnetic core, a shell surrounding the magnetic core, wherein the shell comprises a metal-organic framework material; and a polymer component that substantially surrounds the shell. In some other embodiments, the polymer-functionalized particle can comprise a jarosite material; and a polymer component associated with the jarosite material. Also disclosed herein are embodiments of a method for making polymer-functionalized particle embodiments disclosed herein.

Also disclosed herein are embodiments of a device comprising a flow tube having a hollow interior; a collection component positioned within the hollow interior of the flow tube; a collection matrix material attached to a portion of the collection component; and an electromagnet comprising two magnets, wherein the flow tube is positioned between the two magnets.

Also disclosed herein are embodiments of a system comprising: a fluid feed zone comprising a feed source, one or more valves, and a residence tube component; a magnetic separation zone comprising one or more valves and two or more magnetic separation devices, wherein each magnetic separation device comprises (i) a flow tube having a hollow interior; (ii) a collection component positioned within the hollow interior of the flow tube; (iii) a collection matrix material attached to a portion of the collection component; and an electromagnet comprising two magnets, wherein the flow tube is positioned between the two magnets; a solute isolation zone, comprising a mixer, one or more separator components, and a filter; a magnetic particle regeneration zone, comprising an aqueous salt solution source, one or more mixers, a separator component, and one or more pumps; and a stripping fluid flow loop, comprising a stripping fluid source, one or more holding tanks, and a pump.

Also disclosed herein are embodiments of a method, comprising (i) introducing a feed fluid comprising a polymer-functionalized particle into a system embodiment disclosed herein; (ii) applying a magnetic field to at least one of the magnetic separation devices of the system as the feed fluid passes through one or more of the magnetic separation devices; (iii) turning off the magnetic field; (iv) passing a stripping fluid provided by the stripping fluid source through one or more of the magnetic separation devices; (v) separating the polymer-functionalized particles from any solutes freed from the polymer-functionalized particles by the stripping fluid; (vi) isolating the solutes; (vii) exposing the polymer-functionalized particles to an aqueous salt solution provided by the aqueous salt solution source to provide regenerated polymer-functionalized particles; and (viii) adding the regenerated polymer-functionalized particles to the feed fluid.

The foregoing and other objects and features of the present disclosure will become more apparent from the following detailed description, which proceeds with reference to the accompanying figures.

DETAILED DESCRIPTION

I. Overview of Terms

Figure 1:
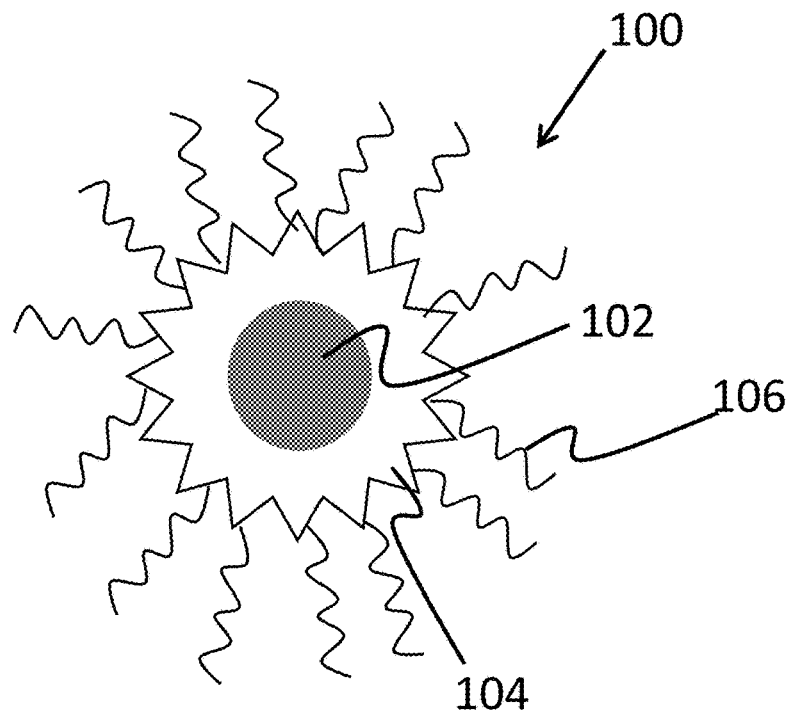
FIG. 1 is an illustration of an exemplary polymer-functionalized particle embodiment.

The following explanations of terms are provided to better describe the present disclosure and to guide those of ordinary skill in the art in the practice of the present disclosure. As used herein, "comprising" means "including" and the singular forms "a" or "an" or "the" include plural references unless the context clearly dictates otherwise. The term "or" refers to a single element of stated alternative elements or a combination of two or more elements, unless the context clearly indicates otherwise.

Unless explained otherwise, all technical and scientific terms used herein have the same meaning as commonly understood to one of ordinary skill in the art to which this disclosure belongs. Although methods and materials similar or equivalent to those described herein can be used in the practice or testing of the present disclosure, suitable methods and materials are described below. The materials, methods, and examples are illustrative only and not intended to be limiting, unless otherwise indicated. Other features of the disclosure are apparent from the following detailed description and the claims.

Unless otherwise indicated, all numbers expressing quantities of components, molecular weights, percentages, temperatures, times, and so forth, as used in the specification or claims are to be understood as being modified by the term "about." Accordingly, unless otherwise indicated, implicitly or explicitly, the numerical parameters set forth are approximations that can depend on the desired properties sought and/or limits of detection under standard test conditions/methods. When directly and explicitly distinguishing embodiments from discussed prior art, the embodiment numbers are not approximates unless the word "about" is recited. Furthermore, not all alternatives recited herein are equivalents.

Also, the following description is exemplary in nature and is not intended to limit the scope, applicability, or configuration of the present disclosure. Various changes to the described embodiment may be made in the function and arrangement of the elements described herein without departing from the scope of the preset disclosure. Further, descriptions and disclosures provided in association with one particular embodiment are not limited to that embodiment, and may be applied to any embodiment disclosed. Further, the terms "coupled" and "associated" generally mean fluidly, electrically, and/or physically (e.g., mechanically or chemically) coupled or linked and does not exclude the presence of intermediate elements between the coupled or associated items absent specific contrary language.

Although the operations of exemplary embodiments of the disclosed method and/or system embodiments may be described in a particular, sequential order for convenient presentation, it should be understood that disclosed embodiments can encompass an order of operations other than the particular, sequential order disclosed, unless the context dictates otherwise. For example, operations described sequentially may in some cases be rearranged or performed concurrently. Further, descriptions and disclosures provided in association with one particular embodiment are not limited to that embodiment, and may be applied to any disclosed embodiment.

To facilitate review of the various embodiments of the disclosure, the following explanations of specific terms are provided.

Aliphatic: A hydrocarbon group having at least one carbon atom to 50 carbon atoms ($C_{1-50}$, such as one to 25 carbon atoms ($C_{1-25}$), or one to ten carbon atoms ($C_{1-10}$), and which includes alkanes (or alkyl), alkenes (or alkenyl), alkynes (or alkynyl), including cyclic versions thereof, and further including straight- and branched-chain arrangements, and all stereo and position isomers as well. Aliphatic groups are distinct from aromatic groups.

Amide Group: —C(O)NR$^a$— wherein R$^a$ is selected from hydrogen, aliphatic, or aromatic and "-" symbols indicate the point of attachment of the amide carbon and/or nitrogen to the polymer component.

Aromatic: A cyclic, conjugated group or moiety of, unless specified otherwise, from 5 to 15 ring atoms having a single ring (e.g., phenyl) or multiple condensed rings in which at least one ring is aromatic (e.g., naphthyl, indolyl, or pyrazolopyridinyl); that is, at least one ring, and optionally multiple condensed rings, have a continuous, delocalized π-electron system. Typically, the number of out of plane π-electrons corresponds to the Hückel rule (4n+2). The point of attachment to the parent structure typically is through an aromatic portion of the condensed ring system. For example,

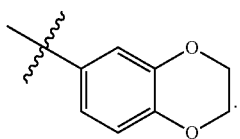 [SMILES: *c1ccc2c(c1)OCCO2]

However, in certain examples, context or express disclosure may indicate that the point of attachment is through a non-aromatic portion of the condensed ring system. For example,

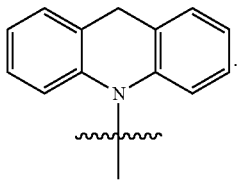 [SMILES: *N1c2ccccc2Cc2ccccc21]

An aromatic group or moiety may comprise only carbon atoms in the ring, such as in an aryl group or moiety, or it may comprise one or more ring carbon atoms and one or more ring heteroatoms comprising a lone pair of electrons (e.g. S, O, N, P, or Si), such as in a heteroaryl group or moiety. Aromatic groups may be substituted with one or more groups other than hydrogen.

Carbonyl Group: —C(O)—, wherein the "-" symbol indicates the point of attachment of the carbonyl group to the polymer component.

Ether Group: -aliphatic-O-aliphatic, -aliphatic-O-aromatic, -aromatic-O-aliphatic, or -aromatic-O-aromatic wherein the "-" symbol indicates the point of attachment of the ether group to the polymer component.

Hydrodynamic Diameter: As measured by dynamic light scattering, the hydrodynamic diameter is the size of a hypothetical hard sphere that diffuses in the same fashion as that of the particle being measured. In practice, particles or macromolecules in solution can be non-spherical, dynamic (tumbling), and solvated. Because of this, the diameter calculated from the diffusional properties of the particle will be indicative of the apparent size of the dynamic hydrated/solvated particle. The hydrodynamic diameter (sometimes referred to as Stokes diameter), therefore is that of a sphere that has the same translational diffusion coefficient as the particle being measured, assuming a hydration layer surrounding the particle or molecule.

Hydroxyl Group: —OH, wherein the "-" symbol indicates the point of attachment of the sulfonate group to the polymer component.

Magnetic Core: A structural component of polymer-functionalized particle embodiments disclosed herein. A magnetic core comprises a metal, a metal oxide, a metal alloy, a jarosite material, or any combination thereof and can be inherently magnetic or can be capable of being magnetized by a magnetic or electromagnetic field. Exemplary magnetic core materials are disclosed herein.

Metal-Organic Framework (MOF): A porous material, which can be crystalline, that is formed by molecular assemblies constructed by coordination bonds between a plurality of metal ion clusters and organic linkers. MOFs can, in some embodiments, be used as a structural component of pre-made and/or polymer-functionalized particles. In some independent embodiments, an MOF material can serve as a magnetic core.

Polymer Component: A structural component of a polymer-functionalized particle that comprises a polymer having one or more types of functional groups capable of interacting with the particle and that facilitates colloidal stabilization of the particle such that uncontrolled aggregation is minimized or avoided. Interactions can include covalent bond interactions, electrostatic interactions, ionic bond interactions, polar bond interactions, and/or hydrogen bonding interactions.

Pre-Made Particle: Pre-made particles do not comprise a polymer component. In embodiments where the particle comprises a magnetic core and the magnetic core comprises a material other than a jarosite material, this term refers to a particle that comprises a magnetic core modified with a shell that surrounds the magnetic core. In such embodiments, the pre-made particles do not include (i) particles wherein a polymer component is attached to the shell without the particle further comprising one or more of the magnetic core and optional ligand species, or (ii) particles wherein a polymer component is attached to the magnetic core without the particle further comprising one or more of the shell and optional ligand species. In embodiments where the magnetic core comprises a jarosite material, this term refers to a particle that comprises a magnetic core without a shell. In some embodiments, such pre-made particles can further comprise one or more ligand species.

Quaternary Amine Group: A functional group comprising a positively charged nitrogen atom attached to a polymer component backbone and at least three other groups or atoms. In some embodiments, the quaternary amine group has a formula —[N(R$^a$)$_3$]$^+$, wherein each R$^a$ independently is selected from hydrogen or a non-hydrogen group, such as aliphatic or aromatic, and wherein the "-" symbol indicates the point of attachment of the group to the polymer component backbone.

Shell: A structural feature of particular polymer-functionalized particle embodiments that are disclosed herein. In some embodiments, the shell is provided by a layer (or multiple layers) of a material, or combination of different materials, that substantially surrounds a magnetic core. In some embodiments, the material of the shell comprises a metal-organic framework material. In some independent embodiments, a shell does not comprise a polymer component and is distinct from polymer components disclosed herein. In embodiments where the shell "substantially surrounds" the magnetic core, the shell covers enough of the magnetic core such that uncontrolled aggregation is minimized and/or prevented. In some embodiments, "substantially surrounds" means that 20% to 100% or less of the surface area of the magnetic core is covered by the shell, such as 20% to 99%, or 20% to 95%, or 20% to 90%, or 30% to 99%, or 30% to 95%, or 30% to 90%, or 40% to 99%, or 40% to 95%, or 40% to 90%, or 50% to 99%, or 50% to 95%, or 50% to 90%.

Sulfonate Group: $-SO_3^-$, wherein the negative charge of the sulfonate group may be balanced with an $M^+$ counter ion, wherein $M^+$ may be an alkali ion, such as $K^+$, $Na^+$, $Li^+$; an ammonium ion, such as $^+N(R^b)_4$ where $R^b$ is H, aliphatic, heteroaliphatic, haloaliphatic, haloheteroaliphatic, or aromatic; or an alkaline earth ion, such as $[Ca^{2+}]_{0.5}$, $[Mg^{2+}]_{0.5}$, or $[Ba^{2+}]_{0.5}$. With reference to the $-SO_3^-$ formula, the "-" symbol before the S indicates the point of attachment of the sulfonate group to the polymer component.

II. Introduction

Rare earth metals are materials that are used in a wide variety of applications in generating and storing renewable energy and in designing more energy efficient devices. Extracting rare earth metals from geothermal brines and other aqueous sources is a very challenging problem due to the low concentrations (e.g., ppm to ppb levels) of these elements as well as engineering challenges (e.g., pressure drop, parasitic pumping power losses) with traditional chemical separations methods using packed sorbent beds or membranes that would impede large volumetric flow rates of these fluids transitioning through an extraction process.

Magnetic particles have found utility in rare earth metals isolation and also can be used in various applications that can capitalize on their magnetic properties, such as enhanced oil recovery, rare earth metal extraction, subsurface imaging, and the like. However, magnetic particles to-date lack the strong colloidal dispersion stability and performance endurance needed in high ionic strength and/or temperature environments for many of these applications, particularly in rare earth metal (and other solutes) extraction/isolation. In particular, particle aggregation under saline environments (particularly at high temperatures) of such magnetic particles leads to dramatic reduction in the overall performance. While methods have been explored to prevent particle aggregation, these methods nevertheless result in reducing particle performance because they lead to decreased access to functional groups needed for solute isolation/extraction. Maintaining a balance between increased particle colloidal stability and performance in high ionic strength solutions (particularly at high temperature) is a challenge that has not been met in the art, but is addressed with polymer-functionalized particle embodiments of the present disclosure.

Polymer-functionalized particle embodiments disclosed herein also can be used in methods for isolating lithium to facilitate use of untapped lithium sources and reduce environmental impacts of massive evaporation ponds used to produce Li today (e.g., such as in Chile and Argentina). Finding technologies that allow for the feasible extraction of Li present in these sources is a goal in the field because existing mineable lithium reserves are not expected to meet market demand in the near future. In addition, the present practice of extraction and evaporation of saline brines in massive holding ponds is facing curtailment in South America, which holds more than half the world's supply of the metal, due to unsustainable consumption of the region's scarce fresh and potential for toxic chemicals to leak from the evaporation pools into the water supply. While methods for extracting lithium from aqueous environments exist, they use adsorbents that lead to several drawbacks. For example, cation exchange resins also adsorb alkaline metals (such as $Mg^{2+}$, $Ca^{2+}$ and $Mn^{2+}$) and thus require expensive pretreatment steps prior to brine exposure to the resin. Other adsorbents, such as polycrystalline hydrated alumina intercalated with LiX (where X is a halogen) may adsorb lithium, but are deficient in terms of sorbent regeneration and lifetime and further exhibit unsatisfactory adsorption capacity, slow exchange kinetics, and a tendency to also uptake Zn. Polymer-functionalized particle embodiments disclosed herein, particularly those containing jarosite as a magnetic material, do not exhibit or result in these drawbacks.

Device and system embodiments in which the polymer-functionalized particles of the present disclosure can be used also are described herein. The device is a magnetic separation device that can isolate solutes, such as rare earth elements, lithium, and the like, from various resources using polymer-functionalized particles comprising a magnetic core. The magnetic separation device not only isolates these solutes, but it also facilitates reuse of polymer-functionalized particles once the solute has been desorbed therefrom. System embodiments provide a semi-continuous flow mechanism for operating the device, which is conducive to implementation in industrial settings as thousands of gallons of fluid per minute can be processed through the system. Because the polymer-functionalized particles can be recycled and regenerated using the device and system embodiments disclosed herein, the need and costs associated with replacing the polymer-functionalized particles is diminished.

III. Polymer-Functionalized Particles

Disclosed herein are embodiments of a polymer-functionalized particle. In some embodiments, the polymer-functionalized particle can comprise a magnetic component (e.g., a core comprising a material that is inherently magnetic or is capable of being magnetized by a magnetic or electromagnetic field) functionalized with a polymer material. In some additional embodiments, the polymer-functionalized particle can comprise a magnetic component (e.g., a core comprising a material that is inherently magnetic or is capable of being magnetized by a magnetic or electromagnetic field) that is modified with a shell that in turn is modified with a polymer component. In yet additional embodiments, the polymer-functionalized particle can comprise an MOF material as a core, which can be functionalized with a polymer component.

The polymer component facilitates colloidal stability of the particle embodiments, particularly in environments having high temperatures and/or ionic strength. Also, the polymer component does not interfere with the ability of the particle to adsorb (or otherwise bind) solutes and thus can promote colloidal stability without sacrificing performance. In particular embodiments, the polymer component is attached to a pre-made particle as a separate component after all other components of the particle have been combined and the pre-made particle is formed. As such, myriad different particle species can be functionalized with myriad different polymer component species, which is a level of flexibility not achievable with current materials.

In particular embodiments, the polymer-functionalized particle comprises a magnetic core; a shell that surrounds (or substantially surrounds) the magnetic core; and a polymer component. An exemplary illustration of a polymer-functionalized particle is illustrated in FIG. 1. Polymer-functionalized particle 100 shown in FIG. 1 comprises magnetic core 102, shell 104, which surrounds the magnetic core, and polymer component 106. Shell 104 can be an MOF material. In some embodiments, the shell can comprise a single shell material or a combination of multiple shell materials. In yet some additional embodiments, the particle can further comprise one or more ligand species that can help promote chelating a solute of interest (e.g., a metal, such as a rare earth metal, or other solute) and stabilizing the chelate. In some embodiments, the ligands are labile, terminal ligands that can be exchanged with the polymer component. Exemplary ligands can include, but are not limited to, alkyl amines (e.g., diethylenetriamine (or DETA)), amoidoxime, phosphonic acid, sulfonic acid, carboxylic acids, resorcinol, formaldehyde, macrocycles (e.g., crown ethers like 14-crown-4-ethers; calixarenes; porphyrins; cyclodextrins; and the like). In yet additional embodiments, the polymer-functionalized particle comprises a magnetic core without a shell component, but that is functionalized with a polymer component that surrounds or substantially surrounds the magnetic core.

The magnetic core of the polymer-functionalized particle can comprise an oxide material, a metallic material, a jarosite material, or a combination thereof. In some embodiments, the magnetic core is paramagnetic and/or ferromagnetic. In some embodiments, the magnetic core comprises iron (e.g., magnetite), cobalt, nickel, iron oxide, cobalt oxide, nickel oxide, or an alloy and/or combination of any such materials. In some embodiments, the magnetic core itself provides the ability to adsorb solutes without requiring a shell. In such embodiments, the magnetic core can comprise a jarosite material.

In some embodiments, the shell comprises a metal-organic framework (MOF) material. The MOF material comprises a metal component and a linker component. Exemplary metal components can include, but are not limited to, Ag, Al, Be, Ca, Cd, Ce, Co, Cr, Cu, Dy, Er, Eu, Fe, Ga, Gd, Ho, In, Li, Mg, Mn, Mo, Nd, Ni, Sc, Sm, Sr, Tb, Tm, V, W, Y, Yb, Zn, Zr, or any and all combinations thereof. The metal component typically has coordinatively unsaturated sites that can promote functionalization with the polymer component. Exemplary linker components can include, but are not limited to, 1,2,4,5-tetrakis(4-carboxyphenyl)benzene, 1,3,5-tris(4'-carboxy[1,1'-biphenyl]-4-yl)benzene 1,3,5-tris (4-carboxyphenyl)benzene, 2,6-naphthalenedicarboxylic acid, 2,5-dihydroxyterephthalic acid, 2-hydroxyterephthalic acid, 2-methylimidazole, 4,5-imidazoledicarboxylic acid, 3,3',5,5'-tetracarboxydiphenylmethane, 4,4',4''-s-triazine-2,4,6-triyl-tribenzoic acid, 4,4',4''-s-triazine-2,4,6-triyl-tribenzoic acid, 9,10-anthracenedicarboxylic acid, biphenyl-3,3',5,5'-tetracarboxylic acid, biphenyl-3,4',5-tricarboxylic acid, imidazole, terephthalic acid, trimesic acid, [1,1':4',1"]terphenyl-3,3',5,5'-tetracarboxylic acid, or any and all combinations thereof. In some embodiments, these linkers can comprise functional groups that can form covalent bonds, ionic bonds, electrostatic interactions, ionic bonds, polar bonds, and/or hydrogen bonds with the polymer component. Representative MOF materials can be selected from chromium terephthalate-based MOFs (e.g., MIL-101), indium imidazole-based MOFs (e.g., sod-Z-MOF), zirconium terephthalate-based MOFs (e.g. MOFs belonging to the UIO-series), or MOFs with a mixture of two or more metals and/or ligands disclosed herein.

In particular disclosed embodiments, the magnetic core can comprise a jarosite material that is magnetic. Such embodiments can exhibit the ability to adsorb solutes without requiring a shell (e.g., a MOF shell). In embodiments comprising a jarosite material, the jarosite material satisfies a formula $AM_3(OH)_6(SO_4)_2$, wherein A is an ion having a +1 charge, such as a Group 1 or 11 ion (e.g., $Na^+$, $K^+$, $Rb^+$, $Cs^+$, $Li^+$, $Ag^+$, or the like), an ammonium ion (e.g., $NH_4^+$, or an aliphatic- or aromatic-substituted version thereof), or a hydroxonium ion ($H_3O^+$); and wherein M is an ion having a +3 charge, such as a Period 4 ion (e.g., Fe, Cr, V, or the like). In particular disclosed embodiments, the jarosite material comprises $(NH_4)Fe_3(SO_4)_2(OH)_6$. Other jarosite materials can include, but are not limited to $NaFe_3(SO_4)_2(OH)_6$, $KFe_3(SO_4)_2(OH)_6$, $RbFe_3(SO_4)_2(OH)_6$, $AgFe_3(SO_4)_2(OH)_6$, $(H_{30})Fe_3(SO_4)_2(OH)_6$, $(NH_4)Cr_3(SO_4)_2(OH)_6$, $NaCr_3(SO_4)_2(OH)_6$, $KCr_3(SO_4)_2(OH)_6$, $RbCr_3(SO_4)_2(OH)_6$, $AgCr_3(SO_4)_2(OH)_6$, $(H_{30})Cr_3(SO_4)_2(OH)_6$, $(NH_4)V_3(SO_4)_2(OH)_6$, $NaV_3(SO_4)_2(OH)_6$, $KV_3(SO_4)_2(OH)_6$, $RbV_3(SO_4)_2(OH)_6$, $AgV_3(SO_4)_2(OH)_6$, $(H_{30})V_3(SO_4)_2(OH)_6$, or combinations thereof.

In some embodiments, the jarosite material can have a crystal structure that comprises octahedral sheets decorated by sulfate tetrahedra with the cations residing between the octahedral-tetrahedral layers. In particular embodiments, bridging hydroxyls connect adjacent metal octahedral. Jarosite materials disclosed herein can be provided as crystalline particles and/or as powders, both of which are capable of exhibiting magnetic behavior. Without being limited to a particular theory, it currently is believed that, in some embodiments, the $M^{3+}$ ions occupy nodes of a triangular lattice with specific magnetic properties, which can contribute the ability to use such jarosite materials for solute isolation, particularly lithium extraction. In some embodiments, the jarosite material is able to adsorb high amounts of lithium per gram of the jarosite material (e.g., 30 mg of lithium per gram of jarosite material) in highly alkaline conditions (e.g., aqueous environments having pH 10). In some embodiments, the structure and/or composition of the jarosite material can be selected to provide a desired solute extraction capability (e.g., to increase or decrease the amount of solute that can be adsorbed by the polymer-functionalized particle comprising the jarosite material). In some embodiments, particle embodiments comprising a jarosite material can have an average particle size ranging from 10 nm to 1 μm, such as 20 nm to 1 μm. In some embodiments using a jarosite material as the particle, the jarosite material can be functionalized with a polymer component as discussed above to control the size of the jarosite-containing particle and/or to improve its colloidal stability.

The polymer component comprises a polymer having at least one functional group capable of coordinating with the magnetic core, the shell, a ligand component of the pre-made particle, or a combination thereof. The polymer also comprises a polymer backbone from which the functional groups can extend. In some embodiments, the functional group of the polymer is a functional group comprising lone pairs that can coordinate with the shell (e.g., such as with a metal of an MOF-containing shell) and/or a charged moiety or atom that can coordinate with the shell and/or the magnetic core. In some embodiments, the polymer can comprise a functional group capable of covalently bonding to a functional group of a component of the shell and/or a functional group of the magnetic core. In some embodiments, the polymer may be used to link a plurality of particles through the backbone and functional groups of the polymer. Exemplary functional groups capable of coordinating with the shell (and/or magnetic core) and/or covalently bonding to a functional group of a component of the shell (and/or magnetic core) can include, but are not limited to, sulfonate groups; ether groups; hydroxyl groups; carbonyl-containing groups (e.g., ester groups, aldehyde groups, and/or carboxyl groups); primary, secondary, tertiary, and/or quaternary amine groups; amide groups; and the like. In particular disclosed embodiments, the polymer component is a sulfonate-containing polymer, a hydroxyl-containing polymer, an ether-containing polymer, an ester-containing polymer, an amine-containing polymer, an amide-containing polymer, or combinations thereof. In some embodiments, any negatively charged polymer components (e.g., polymer components comprising, for example, $SO_3^-$ groups, $CO_2^-$ groups, and the like) can be provided in the form of a salt and thus can comprise positively-charged counterions that balance negatively charged groups on the polymer component. The counterions can be the same or different from one another. Exemplary counterions can include, but are not limited to, $NH_4^+$, $Na^+$, $Li^+$, $K^+$, $Cs^+$, $Mg^{2+}$, $Ca^{2+}$, and the like.

In yet additional embodiments, the polymer component can comprise a polymer having an average molecular weight ($M_w$) ranging from 1,800 to 1,000,000, such as 10,000 to 1,000,000, or 20,000 to 350,000, or 40,000 to 200,000, or 70,000 to 170,000. In some embodiments, the polymer is a sulfonate-containing polymer having an average $M_w$ ranging from 20,000 to 200,000, such as 20,000 to 70,000. In yet additional embodiments, the polymer is an amine-containing polymer (e.g., a polyethyleneimine polymer) having an average $M_w$ ranging from 8,000 to 12,000, such as 10,000. Representative polymers can include, but are not limited to, poly(sodium 4-styrenesulfonate) (or PSS), poly(4-styrenesulfoninc acid-co-maleic acid) sodium salt, polyvinyl sulfate-potassium salt, polyanetholesulfonic acid sodium salt (or PASS), poly(ethylene glycol), poly(ethylene glycol)-block-poly(propylene glycol)-block-poly(ethylene glycol), polydiallyldimethylammonium chloride (or polyDADMAC), Poly(2-acrylamido 2-methyl propane)sulfonic acid, polyethylenimine (branched and comprising 25% primary amine groups, 25% secondary amine groups, and 50% tertiary amine groups), poly(vinylpyrrolidone) (or PVP), poly(4-styrenesulfonic acid ammonium salt), chitosan, dextran sulfate, or combinations thereof.

Figures 2A, 2B:
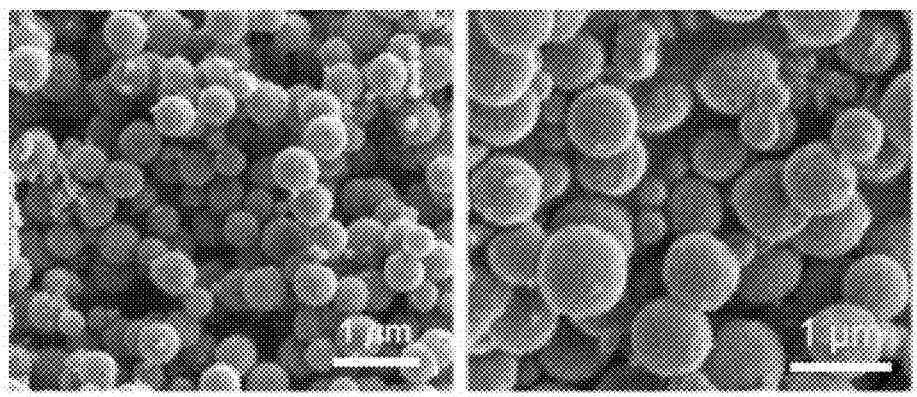
FIGS. 2A-2C show scanning electron microscope (SEM) images of $Fe_3O_4$ particles (FIG. 2A), PSS-functionalized $Fe_3O_4$ particles (FIG. 2B), and In-MOF-functionalized $Fe_3O_4$ particles (FIG. 2C).
Figure 2C:
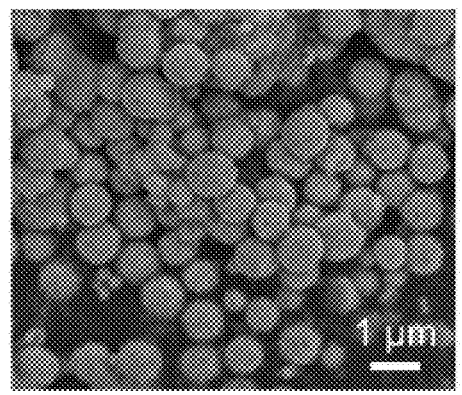

FIGS. 2A-2C provide images of iron-containing magnetic core components (specifically, $Fe_3O_4$ particles), polymer-functionalized magnetic cores (specifically, PSS-functionalized $Fe_3O_4$ particles), and MOF-functionalized magnetic cores (specifically In-MOF-functionalized $Fe_3O_4$ particles).

The size of the magnetic core component of the polymer-functionalized particles can be controlled so as to promote their activity and ability to be isolated and recaptured during use in the magnetic separation device and system embodiments described herein. In some embodiments, the magnetic core can have an average diameter size of 10 nm or higher. In some embodiments, the particle can have an average size (e.g., an average diameter) that is small enough to prevent magnetically-promoted aggregation and that is not so large that gravitational forces, rather than Brownian motion, dominate as the particles flow through a flow tube of the magnetic separation device embodiments disclosed herein. In some embodiments, the polymer-functionalized particles have diameters ranging from 100 nm to 1 µm, such as 100 nm to 10 µm, or 100 nm to 5 µm. In some representative embodiments, the polymer-functionalized particle has an average diameter size of 100 nm with a magnetic core having an average diameter size ranging from 70 nm to 80 nm. In exemplary embodiments, the polymer-functionalized particles have average diameters ranging from 100 nm to 1 µm.

In some embodiments, the particles comprising the polymer component exhibit enhanced colloidal stability as compared to particles that are not functionalized with the polymer component. In particular embodiments, colloidal stability can be determined by evaluating the hydrodynamic diameter of a polymer-functionalized particle in an aqueous solution, or an average hydrodynamic diameter of a plurality of polymer-functionalized particles in an aqueous solution, before and after a change in the solution's ionic strength and/or temperature occurs. In some embodiments, colloidal stability is evidenced by the fact that particles functionalized with a polymer component do not exhibit uncontrolled levels of aggregation when exposed to a highly ionic solution, a high temperature solution, or both. In some embodiments, uncontrolled aggregation can be evidenced by a large increase in hydrodynamic diameter (or average hydrodynamic diameter) when the particle is exposed to a high ionic strength solution, such as a geothermal brine (e.g., solutions having a pH ranging from 4 to 10, such as Salton Sea geothermal brine) or an aqueous solution comprising ionic salt (e.g., NaCl, KCl, or the like) or an acid (e.g., HCl), particularly those having a concentration of 0.1 M to 5 M of the ionic salt or acid, such as 0.1 M to 2 M, or 0.1 M to 1M of the ionic salt or acid. In some additional embodiments, uncontrolled aggregation can be evidenced by a large increase in hydrodynamic diameter (or average hydrodynamic diameter) when a solution comprising the particle (or plurality of particles) is exposed to high temperatures, such as temperatures ranging from 70° C. to 150° C., such as 70° C. to 100° C., or 70° C. to 95° C. In yet additional embodiments, uncontrolled aggregation can be evidenced by a large increase in hydrodynamic diameter (or average hydrodynamic diameter) when a solution comprising the particle (or plurality of particles) is exposed to both high temperatures and a high ionic strength solution as described above. In such embodiments, a large increase can comprise an increase of 45% or higher, such as a 45% to 200% increase, or a 45% to 100% increase in the hydrodynamic diameter.

In some embodiments, the particles are functionalized with the polymer component using a post-particle synthesis method. Polymer-functionalized particles made using such method embodiments exhibit enhanced colloidal stability, particularly in high ionic strength fluids and/or high temperature environments, and at the same time maintain the ability to be activated by a magnetic field. As such, the method embodiments described herein can be used to make polymer-functionalized particles that comprise a polymer component that increases steric repulsion between particles thereby avoiding aggregation in high ionic strength fluids (even at high temperatures) without interfering with the performance of the polymer-functionalized particle in attracting, isolating, and extracting solutes from fluid solutions. The post-particle synthesis method embodiments facilitate grafting of the polymer component onto the surface of the particle shell, such as an MOF-containing shell, which increases the steric and surface charges that result in particle repulsion (and thus prevent unwanted/uncontrolled aggregation). In particular embodiments when the polymer component is added to pre-made particles comprising a shell component, the polymer component can coordinate to unsaturated metal centers in the MOF material while leaving active open metal centers and ligand components within the MOF material free to selectively interact with solutes in fluids. And, because certain method embodiments involve adding the polymer component to pre-made particles, it can be used to make myriad particles comprising different magnetic cores, different shell materials, and/or different ligands without requiring significant and costly adjustments to particle synthesis.

In particular embodiments, method used to make the polymer-functionalized particles is a post-particle synthesis method, which comprises exposing a pre-made particle to a polymer component solution. The pre-made particle constitutes a particle that comprises all components needed to attract, coordinate, and extract a solute (e.g., a rare earth metal, lithium, or the like) from a fluid, but that exhibits a propensity to aggregate without the polymer component. In particular embodiments, the pre-made particle can comprise a magnetic core, an MOF shell, and one or more optional ligands and/or optional additional shell layers or shell components. In yet additional embodiments, the pre-made particle can comprise a magnetic core comprising a jarosite material without any shell component. The polymer component solution comprises at least one polymer species and an aqueous solvent (e.g., water, or a water-containing solvent). In some embodiments, the polymer component solution can comprise a mixture of different polymer species. In some embodiments, the polymer component solution has a polymer concentration ranging from greater than 0 wt % to 10 wt %, such as 0.5 wt % to 3 wt %, or 1 wt % to 2. In some embodiments, the polymer concentration is 1 wt % or 2 wt %. The pre-made particle and the polymer component solution can be combined at a temperature and for a time period sufficient to allow coordination between the polymer component and the pre-made particle. In some embodiments, the temperature is ambient temperature and the time period ranges from 30 minutes or longer, such as 30 minutes to three hours or more.

IV. Magnetic Separation Device and System

Also disclosed herein are embodiments of a magnetic separation device and a system comprising the magnetic separation device. The magnetic separation device and system embodiments can be used to extract solutes from fluids using polymer-functionalized particle embodiments disclosed herein. The magnetic separation device and system embodiments provide a fluid loop that can be used to isolate solutes from a fluid using the polymer-functionalized particle embodiments, particularly those comprising a magnetic core, and then regenerate the polymer-functionalized particle embodiments by separating the solutes therefrom and recycling the polymer-functionalized particle embodiments back into the fluid loop. In some embodiments, a gas-fluid interface is used in the magnetic separation device and system to promote polymer-functionalized particle accumulation at the collection component and/or polymer-functionalized particle/solute release from the collection component. Additional features and aspects of the device and system are described below.

Magnetic separation device embodiments comprise an electromagnet, at least one flow tube, and a collection component. In some embodiments, the magnetic separation device can further comprise a collection matrix material.

The flow tube component is a hollow tube which can have any suitable shape as long as fluid is able to flow into and out of the interior of the tube. In some embodiments, the hollow tube can be cylindrical, rectangular, square, or any other suitable geometry that can provide a hollow space through which fluid can flow. In particular disclosed embodiments, the flow tube is a cylindrical hollow tube. In some embodiments, the flow tube is made of a material that does not attract (magnetically, electrostatically, or otherwise) the polymer-functionalized particles. Exemplary materials for the flow tube can include glass, or Teflon, glass-lined metal, Teflon-lined metal, or the like. The size (e.g., inner and outer diameters and/or length) of the flow tube can be modified based on operational parameters, such as the volume of fluid to be introduced into the system, the flow rate at which the fluid is to flow through the system, and/or the linear axial velocity of the fluid. In some embodiments, one flow tube can be used. In other embodiments, a plurality of flow tubes (e.g., 2 or more, such as 2 to 50, or 2 to 25, or 2 to 20, or 2 to 10 flow tubes) can be used. In embodiments comprising a plurality of flow tubes, each flow tube can be positioned adjacent the other flow tubes of the plurality and may touch one another, or may be segregated by a distance from one another.

The collection component comprises a material capable of being activated by the electromagnet such that it can magnetically attract polymer-functionalized particles comprising a magnetic core that enter and flow through the flow tube and immobilize the polymer-functionalized particles. For example, the collection component comprises a material capable of being influenced by an electromagnetic field. In particular disclosed embodiments, the collection component comprises, or is made of, steel or iron. Exemplary collection components are steel substrates (e.g., a steel rod, a steel wires, or a steel sheet) that are shaped and sized such that they can fit within the flow tube. In some embodiments, the collection component can have a length that is the same as, less than, or greater than the length of the flow tube in which it is contained. In particular embodiments, at least one collection component is included in one flow tube of the magnetic separation device. In embodiments comprising a plurality of flow tubes, each flow tube of the plurality can comprise a collection component within its interior. In yet some additional embodiments, one or more collection components can be included in a single flow tube. The collection component is positioned inside an inner diameter of the flow tube. In particular embodiments, the collection component does not touch an inner surface of the flow tube that defines the inner diameter of the flow tube. As such, fluid is able to flow by the collection component and within the inner diameter of the flow tube so that any polymer-functionalized particles in the fluid are able to be attracted to the collection component upon application of an electromagnetic field.

In some embodiments, the collection component can be modified with the collection matrix material such that all or a portion of the surface area of the collection component is covered with the collection matrix material. The collection matrix material can be used to facilitate aggregation and isolation of the polymer-functionalized particles as they flow through the flow tube. The collection matrix material comprises a material that is susceptible to a magnetic field and thus can be activated to attract the polymer-functionalized particles and provide additional surface area (that is, in addition to the surface area of the collection component) to which the polymer-functionalized particles can be attracted. The collection matrix material also can assist with increasing the retention rate of the polymer-functionalized particles. As such, few polymer-functionalized particles are able to flow through the flow tube without being attracted to and isolated by the collection component. By helping to increase the retention rate of the polymer-functionalized particles, the collection matrix material can help improve isolation yields of solutes captured by the polymer-functionalized particles and also can help increase the yield of recycled polymer-functionalized particles after solutes are removed therefrom. In particular disclosed embodiments, the collection matrix material is a sheet comprised of a metal wool (e.g., steel wool) that can be wrapped around the collection component such that it fully surrounds the collection component or covers portions of the collection component. In particular disclosed embodiments, a single sheet of the collection matrix material is used. The collection matrix material can be adhered to the collection component with a suitable adhesive or physically associated with the collection component without an adhesive.

Figure 3:
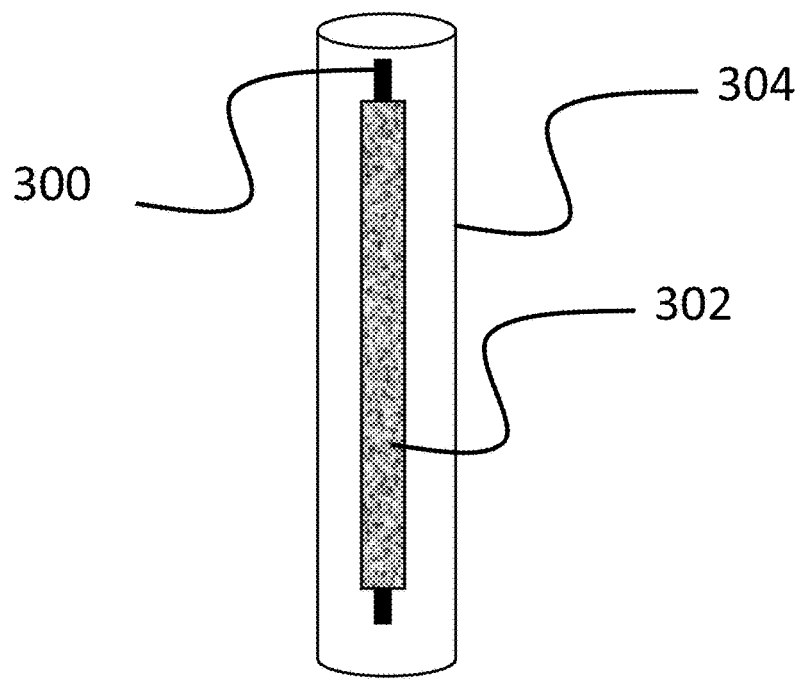
FIG. 3 is an illustration of an exemplary flow tube component comprising a collection component and a collection matrix material.
Figure 4:
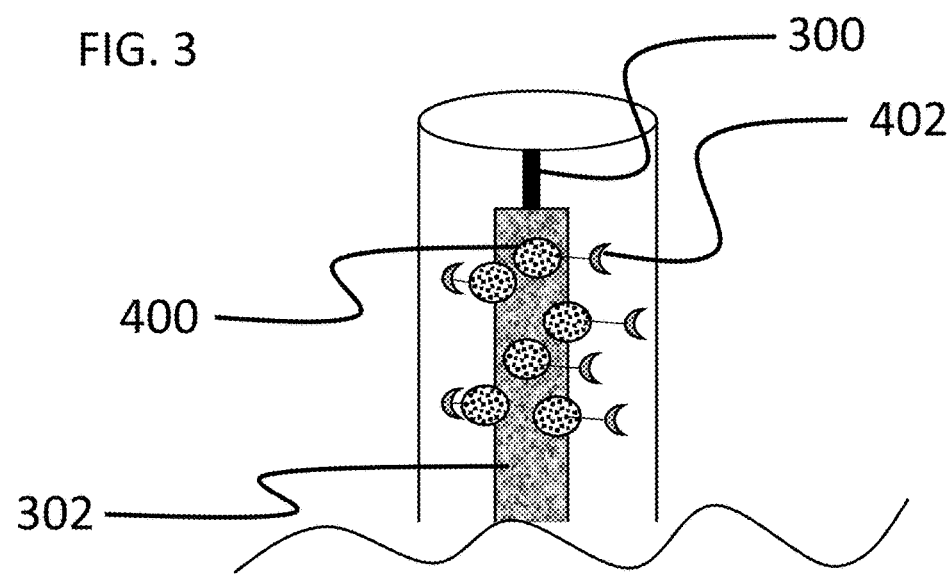
FIG. 4 is an illustration of an exemplary flow tube component in which solute-bound polymer-functionalized particles comprising a magnetic core are contained and attached to a collection component and a collection matrix material.
Figure 5A:
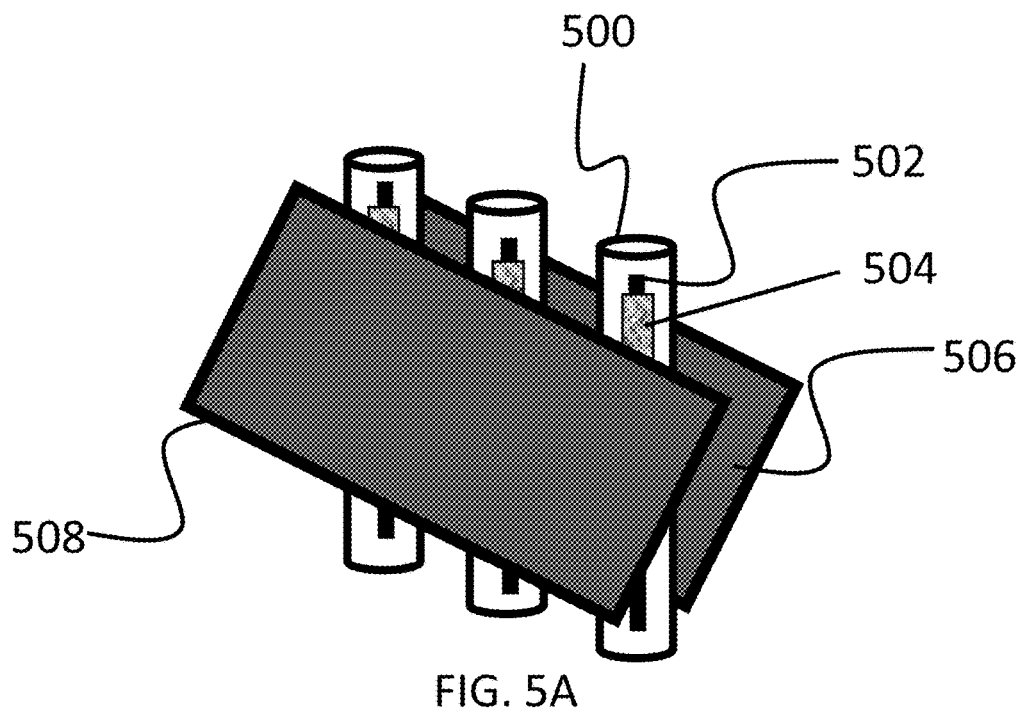
FIGS. 5A and 5B are illustration of representative embodiments of a magnetic separation device.
Figure 5B:
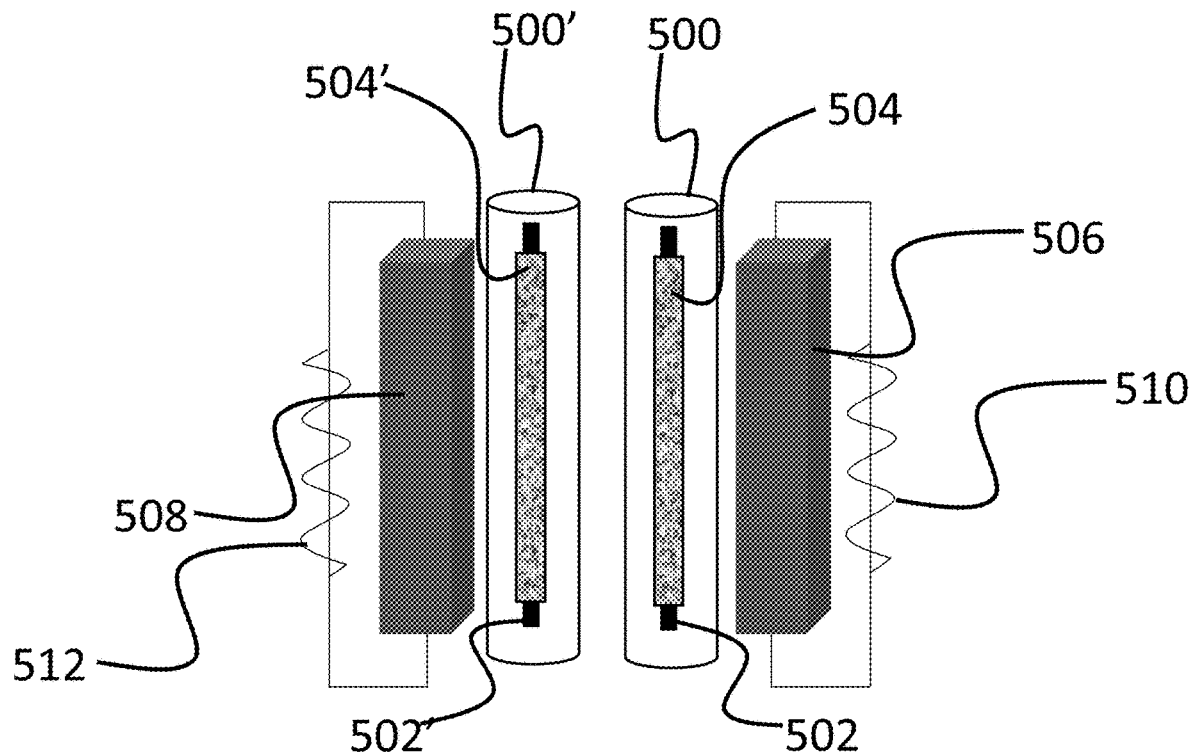

FIG. 3 provides an illustration of how the flow tube, collection component, and collection matrix material can be configured together. As shown in FIG. 3, a region of the collection component 300 is associated with collection matrix material 302 and is positioned in the interior of flow tube 304. FIG. 4 illustrates a portion of the configured components illustrated in FIG. 3 after a magnetic field has been applied and polymer-functionalized particles (e.g., particles 400) comprising solutes (e.g., solutes 402) are able to associate with collection component 300 and/or collection matrix material 302. FIGS. 5A and 5B illustrate exemplary set-ups of the components of a representative magnetic separation device. In FIG. 5A, three flow tubes (e.g., flow tube 500) each comprising a collection component (e.g., collection component 502) and a collection matrix material (e.g., collection matrix material 504) are positioned between two magnet plates 506 and 508 of an electromagnet (other components not illustrated) in parallel. In another embodiment, such as the embodiment illustrated in FIG. 5B, two (or more) flow tubes (e.g., flow tubes 500 and 500') comprising collection components (e.g., collection components 502 and 502') and collection matrix material (e.g., collection matrix material 504 and 504') can be positioned next to one another and between magnet plates (e.g., magnets 506 and 508) of an electromagnet (e.g., represented by coils 510 and 512).

Also disclosed are embodiments of a system comprising the magnetic separation device. In some embodiments, the system comprises a magnetic separation zone comprising one or more magnetic separation devices, such as 2 to 10, or 2 to 8, or 2 to 6, or 2 to 4 magnetic separation devices. In particular disclosed embodiments, the magnetic separation zone comprises two or more magnetic separation devices. In such embodiments, the two or more magnetic separation devices are positioned such that they can belong to the same flow loop, which comprises one or more fluid control valves to control fluid flow through the flow loop comprising the two or more magnetic separation devices.

The system can further comprise a fluid feed zone, a solute isolation zone, and a polymer-functionalized particle regeneration zone. The fluid feed zone can comprise a feed tank that comprises the fluid to be passed through the system. The fluid can be provided by a geothermal source and can be a geothermal brine liquid. The geothermal brine liquid can comprise one or more solutes, such as rare earth elements (e.g., scandium (Sc), yttrium (Y), and the 15 lanthanide elements lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb)), lithium, or combinations thereof. In some embodiments, the geothermal brine liquid has high salinity or high ionic strength (e.g., pH 4 to 10) and/or high temperatures (e.g., 70° C. or higher, such as 70° C. to 150° C., or 80° C. to 110° C., or 85° C. to 100° C., or 90° C. to 95° C.). In additional embodiments, the feed tank can comprise a second fluid, such as a gas. In such embodiments, the gas is fed into the feed tank through a gas feed line. In some embodiments, the gas can be introduced in other zones of the system, such as in the magnetic separation zone, where it can be combined with the fluid from the feed tank or a stripping fluid (provided by a stripping fluid flow loop that can also be fluidly coupled to the magnetic separation zone) prior to entering either magnetic separation device. The mixture of gas and brine solution provides a gas/liquid interface that helps facilitate polymer-functionalized particle aggregation at the collection component during use of the magnetic separation device and system. In embodiments where the gas is introduced in the magnetic separation zone with a stripping fluid from a stripping fluid flow loop, the gas can help facilitate removing the polymer-functionalized particles and solutes from the collection component and/or collection matrix material.

The fluid feed zone can further comprise a polymer-functionalized particle introduction region wherein the polymer-functionalized particles are combined with the fluid. In some embodiments, a residence tube component is included in the polymer-functionalized particle introduction region and can be used to help facilitate solute binding to the polymer-functionalized particles by increasing the amount of time the solutes are able to interact with the polymer-functionalized particles. A fluid feed loop is provided that fluidly connects the feed tank, the polymer-functionalized particle introduction region, the residence tube component, and an outlet that flows fluid to an external environment. Flow through the fluid feed loop can be controlled by one or more valves, such as a three-way valve or other suitable valve. One or more valves can be used to introduce the polymer-functionalized particles into the residence tube component, such as a check valve. In some embodiments, the fluid feed zone is positioned before the magnetic separation zone such that fluid, solutes, and polymer-functionalized particles from the fluid feed zone and fluid flow loop are introduced into the magnetic separation zone by way of one or more valves (e.g., a three-way valve or other suitable valve).

The solute isolation zone can comprise a mixing tank, one or more separator components (e.g., a centrifugal separator, a fluid-fluid separator, or a combination thereof), a filter, and any combination thereof. These components are fluidly coupled. In some embodiments, the solute isolation zone comprises a mixing tank comprising a mixer, which facilitates mixing of the released polymer-functionalized particles comprising solutes and the stripping fluid used to promote release of the solutes from the polymer-functionalized particles. The mixing tank is fluidly coupled to a separator component, such as a centrifugal separator, which facilitates separating the solid polymer-functionalized particles from a stripping fluid comprising desorbed solute ions.

The desorbed solute ions are provided by exposing the polymer-functionalized particles comprising the adsorbed solute ions to a stripping fluid, such as an acidic solution. In some embodiments, the acidic solution is a dilute acidic aqueous solution comprising water and an acid and that has a pH of greater than 0 to 3, such as a pH of 1, 2, or 3. In some embodiments, the acid can be any mineral acid, such as hydrochloric acid, phosphoric acid, nitric acid, sulfuric acid, and the like. The stripping fluid can be provided by using a stripping fluid flow loop that is fluidly coupled to the magnetic separation zone. This stripping fluid flow loop can comprise one or more tanks, such as an acidic solution tank and a holding tank, and one or more pumps and/or valves to facilitate flow through the stripping fluid flow loop. In some embodiments, the stripping fluid is passed through the magnetic separation device during a time period wherein no electromagnetic field is applied to the magnetic separation device. In yet additional embodiments, the stripping fluid typically is introduced into the magnetic separation device separately from any fluid introduced from the feed tank. For example, the system can be run in a semi-continuous manner such that there is only a short time period (e.g., 1 second to 60 seconds or less) between stopping fluid flow from the feed tank into the magnetic separation device and starting stripping fluid flow from the stripping fluid flow loop into the magnetic separation device. In particular embodiments, stripping fluid is not introduced into the magnetic separation zone at the same time as any feed fluid and instead is contained in the stripping fluid flow loop until after a period of time during which feed fluid is allowed to enter one (of more) of the magnetic separation devices, at which time the magnets are activated. After a period of time, the magnets can be turned off, feed fluid flow can be stopped, and then stripping fluid can be introduced into the magnetic separation device (or devices). In some embodiments, the magnets of each magnetic separation device are actuated at the same time or at different times such that one device is magnetized while another is not. As mentioned above, the stripping fluid can facilitate removing the polymer-functionalized particles from the collection component(s) and flow tube(s) (e.g., by virtue of its flow velocity) and also facilitates desorbing solute ions from the polymer-functionalized particles.

With further reference to the solute isolation zone, solid polymer-functionalized particles exit the centrifugal separator through an exit region and the separated stripping fluid comprising the solute ions is sent to an additional separator component, such as a liquid-liquid separator. The solute ions can then be collected from the system for use. Liquid exiting the liquid-liquid separator can be passed through a filter and then re-introduced into the stripping fluid flow loop, which delivers the recycled stripping fluid back to the magnetic separator device.

The system can further comprise a polymer-functionalized particle regeneration zone. The polymer-functionalized particle regeneration zone is fluidly coupled to the solute isolation zone and accepts the solid polymer-functionalized particles from the exit region of the separator component of the solute isolation zone. The polymer-functionalized particle regeneration zone can comprise one or more mixing tanks, a separator component, a holding tank, and one or more pumps and/or valves. In some embodiments, the separator component is a centrifugal separator (which can be the same or different type of centrifugal separator component as that used in the solute isolation zone). The holding tank can contain an aqueous salt solution that is used to reactivate the polymer-functionalized particles. The aqueous salt solution can comprise water and a salt, such as bicarbonate. The aqueous salt solution from the holding tank can be introduced into a magnetic particle flow loop through which water (introduced from an external source) and the used polymer-functionalized particles flow such that the used polymer-functionalized particles are exposed to the aqueous salt solution and are regenerated/reactivated. The regenerated/reactivated polymer-functionalized particles can then be passed through the centrifugal separator and delivered to a mixing tank, which is fluidly coupled to the feed flow loop such that the regenerated/reactivated polymer-functionalized particles are reintroduced into the feed flow loop and reused.

Figure 6:
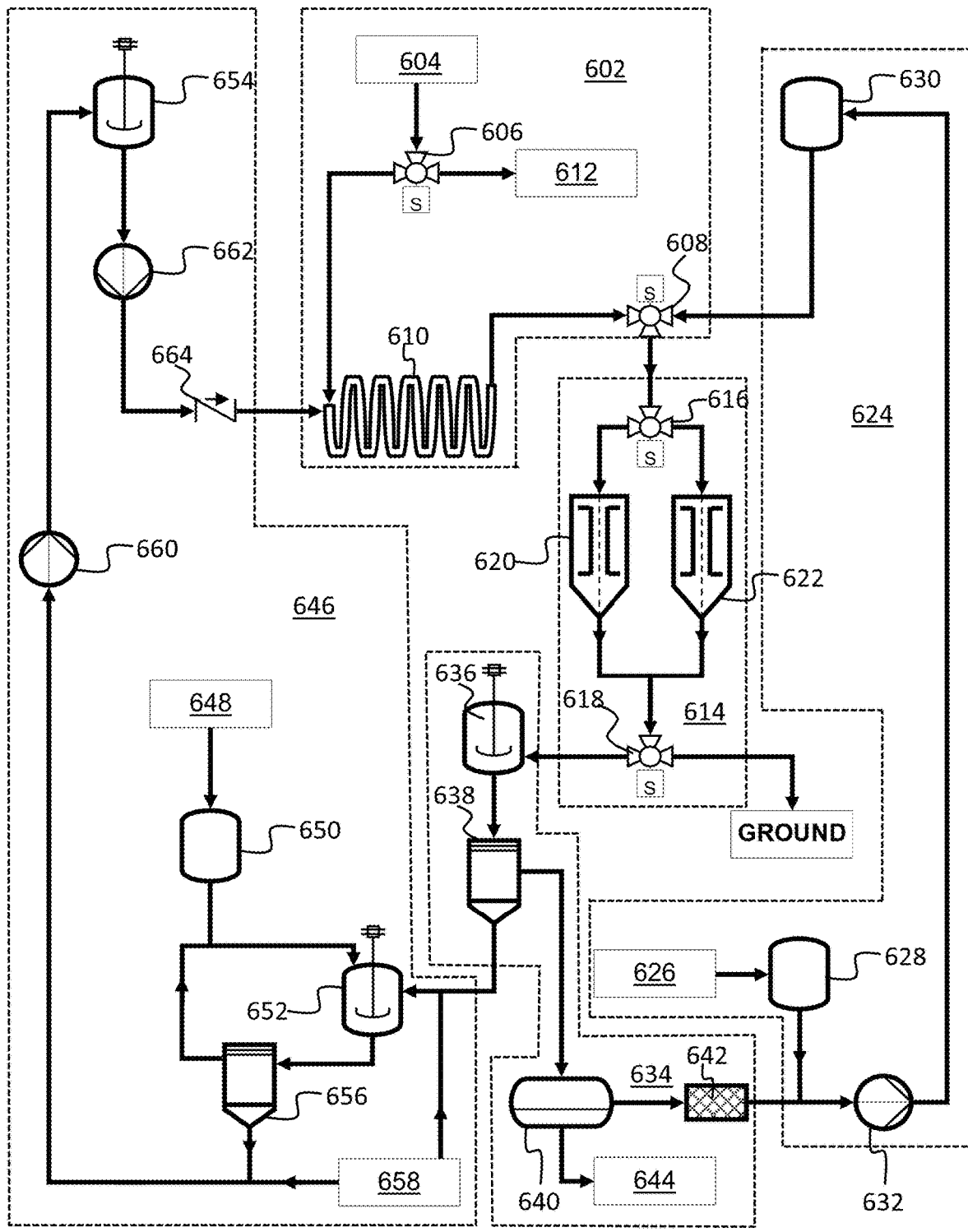
FIG. 6 provides a schematic illustration of a representative magnetic separation system embodiment.

A representative system embodiment is illustrated in FIG. 6. FIG. 6 illustrates representative system 600, which comprises various zones and components as described above. For example, system 600 comprises a fluid feed zone 602, which comprises feed source 604, one or more valves (e.g., three-way valves 606 and 608), residence tube component 610, and waste region 612. Feed source 602 provides a fluid to be introduced into the system, which can comprise one or more solutes (e.g., REEs) and the polymer-functionalized particles (or the polymer-functionalized particles can be provided by the polymer-functionalized particle regeneration zone). Three-way valve 606 fluidly couples feed source 604 to residence tube component 610. Residence tube component 610 is fluidly coupled to three-way valve 608. Waste and/or excess fluid can be expelled to waste region 612. System 600 further comprises magnetic separation zone 614, which comprises one or more valves (e.g., three-way valve 616 and 618), and two or more magnetic separation devices (e.g., magnetic separation devices 620 and 622). Three-way valves 608 and 616 also are fluidly coupled to stripping fluid flow loop 624, which comprises a stripping fluid source 626, one or more holding tanks (e.g., holding tanks 628 and 630) and pump 632. Stripping fluid source 626 is fluidly coupled to holding tanks 628 and 630 and stripping fluid can be passed through stripping fluid flow loop 624 with pump 632. Stripping fluid can be passed from holding tank 630 and introduced into magnetic separation zone 614, when needed, to facilitate removal of polymer-functionalized particles and solutes from the magnetic separation zone.

System 600 further comprises solute isolation zone 634, which comprises mixer 636, centrifugal separator 638, liquid-liquid separator 640, and filter 642. As solutes are separated from the polymer-functionalized particles with the stripping fluid, they are passed to mixer 636 and are separated from the stripping fluid using centrifugal separator 638 and liquid-liquid separator 640. Stripping fluid then is passed through filter 642 and reintroduced into stripping fluid flow loop 624. Isolated solutes 644 are isolated after passing through liquid-liquid separator 640.

System 600 further comprises polymer-functionalized particle regeneration zone 646, which comprises aqueous salt solution source 648, holding tank 650, one or more mixers (e.g., mixers 652 and 654), centrifugal separator 656, water source 658, one or more pumps (e.g., pumps 660 and 662), and check valve 664. As the polymer-functionalized particles are separated from solutes and expelled by centrifugal separator 638, they are introduced into magnetic separation zone 646, where they are combined with water from water source 658 and enter mixer 652 where they are combined with an aqueous salt solution from aqueous salt solution source 648 and holding tank 650. The regenerated polymer-functionalized particles are then introduced into centrifugal separator 656 and are sent back to be combined with the feed fluid using pumps 660 and 662, mixer 654, and check valve 664.

V. Methods

Also disclosed herein are embodiments of a method for using polymer-functionalized particle embodiments and magnetic separation system and device embodiments disclosed herein. In some embodiments, the method comprises separating and isolating solutes from a fluid using embodiments of the polymer-functionalized particle disclosed herein in combination with a magnetic separation system and/or device embodiment. In some embodiments, the method comprises steps that can be carried out in a semi-continuous process, rather than in batch-mode. Nevertheless, the method embodiments disclosed herein are not limited to semi-continuous methods and can include batch-mode method embodiments. Method embodiments disclosed herein can be used to isolate various solutes, such as REEs, lithium, and combinations thereof from various sources, such as geothermal brine.

In particular embodiments, the method comprises exposing a fluid to a polymer-functionalized particle. The fluid can comprise one or more solutes, such as REEs and/or lithium. In some embodiments, the fluid is a geothermal brine or other fluid resource. The polymer-functionalized particles will bind or otherwise immobilize any solutes present in the fluid. The method can further comprise exposing the fluid and the polymer-functionalized particle to a magnetic field. In some embodiments, a plurality of polymer-functionalized particles and the fluid can be delivered via a flow path into a device and/or system embodiment of the present disclosure to facilitate magnetic separation of the polymer-functionalized particle (and any solute associated with the polymer-functionalized particle). As the polymer-functionalized particles and the fluid flow through the device and/or the system, the magnetic force will facilitate separation of the polymer-functionalized particles, and any solutes associated therewith, from the fluid. The method can further comprise introducing a stripping fluid into the device and/or system and removing a magnetic field after a certain period of time. By removing the magnetic field and introducing the stripping fluid, the polymer-functionalized particles and solutes can be removed from the device and/or system and the solutes can also be physically and/or chemically separated from the polymer-functionalized particles. In some embodiments, these method steps can be repeated any number of times to provide a semi-continuous flow method whereby solutes are separated and isolated in quantities and within time periods not feasible with conventional separation techniques.

In particular disclosed method embodiments, the polymer-functionalized particle can comprise a core as described herein. In particular method embodiments, the polymer-functionalized particle can comprise a jarosite core. Such embodiments can be useful for methods involving extracting lithium from a geothermal source. In yet additional method embodiments, the polymer-functionalized particle can comprise an iron-containing core. Such embodiments can be useful for methods involving extracting REEs from a geothermal source. When the polymer-functionalized particle is introduced into a device and/or system embodiment as described herein, it can bind solutes present in the feed fluid and can be attracted to the collection component upon application of a magnetic field. Undesired contaminants and/or components included in the fluid can be separated as these will flow through the flow tube component and will not adhere to the collection component. The method can then comprise removing the magnetic field and introducing a stripping fluid into the device or system. By removing the magnetic field, the polymer-functionalized particles can be dissociated from the collection component. By adding the stripping fluid, any solutes bound to the polymer-functionalized particles can be separated therefrom and isolated. In some embodiments, the method can further comprise an isolation step wherein the solutes are extracted and separated from any stripping fluid and/or any polymer-functionalized particles. In yet additional embodiments, the method can further comprise exposing the polymer-functionalized particles to an aqueous salt solution comprising water and a salt (e.g., bicarbonate), subsequent to solute removal to facilitate regeneration of the polymer-functionalized particles.

VI. Overview of Several Embodiments

Disclosed herein are embodiments of a polymer-functionalized particle, comprising: a magnetic core; a shell surrounding the magnetic core, wherein the shell comprises a metal-organic framework material; and a polymer component that substantially surrounds the shell.

In some embodiments, the magnetic core comprises iron or an alloy thereof, nickel or an alloy thereof, an iron oxide or an alloy thereof, a nickel oxide or an alloy thereof, or any combination thereof.

In any or all of the above embodiments, the magnetic core comprises iron oxide, cobalt, or nickel.

In any or all of the above embodiments, the polymer-functionalized particle further comprises one or more ligand species associated with the shell.

In any or all of the above embodiments, the polymer component comprises one or more functional groups that coordinates with the shell, wherein the functional groups are selected from sulfonate groups, ether groups, hydroxyl groups, carbonyl groups, amine groups, amide groups, or a combination thereof.

In any or all of the above embodiments, the polymer component is a sulfonate-containing polymer or an amine-containing polymer.

In any or all of the above embodiments, the polymer component is poly(4-styrenesulfonic acid) sodium salt or poly(4-styrenesulfonic acid) ammonium salt.

In any or all of the above embodiments, the polymer component is a polyethyleneimine polymer having an average molecular weight ranging from 8,000 to 12,000.

In any or all of the above embodiments, the polyethyleneimine polymer comprises 25% primary amine groups, 25% secondary amine groups, and 50% tertiary amine groups.

In any or all of the above embodiments, the metal-organic framework material comprises chromium, terephthalate, and benzoic acid, or a benzoic acid derivative.

In any or all of the above embodiments, the polymer-functionalized particle exhibits colloidal stability in a solution having a pH ranging from 4 to 10, such that a hydrodyamic diameter of the polymer-functionalized particle, and/or an average hydrodynamic diameter of a plurality of polymer-functionalized particles, does not change by 45% or more as compared to a hydrodyamic diameter of an identical magnetic particle without the polymer component, and/or an average hydrodynamic diameter of a plurality of identical magnetic particles without the polymer component.

Also disclosed herein are embodiments of a polymer-functionalized particle, comprising: a jarosite material; and a polymer component associated with the jarosite material.

In some embodiments, the jarosite material satisfies a formula $AM_3(OH)_6(SO_4)_2$, wherein A is an ion having a +1 charge and wherein M is an ion having a +3 charge.

In any or all of the above embodiments, the jarosite material is $(NH_4)Fe_3(SO_4)_2(OH)_6$.

Also disclosed herein are embodiments of a method for making the polymer-functionalized particle according to any or all of the above embodiments, comprising combining a polymer component solution and a pre-made magnetic particle comprising (i) a magnetic core and (ii) a shell comprising a metal-organic framework material that surrounds the magnetic core.

Also disclosed herein are embodiments of a device, comprising: a flow tube having a hollow interior; a collection component positioned within the hollow interior of the flow tube; a collection matrix material attached to a portion of the collection component; and an electromagnet comprising two magnets, wherein the flow tube is positioned between the two magnets.

In some embodiments, the device comprises one or more additional flow tubes each having a hollow interior, wherein each additional flow tube also comprises a collection component within its hollow interior and a collection matrix material attached to a portion of the collection component and wherein all flow tubes are positioned parallel to one another and between the two magnets.

Also disclosed herein are embodiments of a system, comprising: a fluid feed zone comprising a feed source, one or more valves, and a residence tube component; a magnetic separation zone comprising one or more valves and two or more magnetic separation devices, wherein each magnetic separation device comprises (i) a flow tube having a hollow interior; (ii) a collection component positioned within the hollow interior of the flow tube; (iii) a collection matrix material attached to a portion of the collection component; and an electromagnet comprising two magnets, wherein the flow tube is positioned between the two magnets; a solute isolation zone, comprising a mixer, one or more separator components, and a filter; a magnetic particle regeneration zone, comprising an aqueous salt solution source, one or more mixers, a separator component, and one or more pumps; and a stripping fluid flow loop, comprising a stripping fluid source, one or more holding tanks, and a pump.

In some embodiments, (i) the fluid feed zone and the stripping fluid flow loop are fluidly coupled to the magnetic separation zone; (ii) the magnetic separation zone is fluidly coupled to the solute isolation zone; (iii) the solute isolation zone is fluidly coupled to the stripping fluid flow loop and a magnetic particle regeneration zone, which is fluidly coupled to the fluid feed zone.

Also disclosed herein are embodiments of a method, comprising (i) introducing a feed fluid comprising a polymer-functionalized particle according to any or all of the above embodiments into a system according to any or all of the above system embodiments; (ii) applying a magnetic field to at least one of the magnetic separation devices of the system as the feed fluid passes through one or more of the magnetic separation devices; (iii) turning off the magnetic field; (iv) passing a stripping fluid provided by the stripping fluid source through one or more of the magnetic separation devices; (v) separating the polymer-functionalized particles from any solutes freed from the polymer-functionalized particles by the stripping fluid; (vi) isolating the solutes; (vii) exposing the polymer-functionalized particles to an aqueous salt solution provided by the aqueous salt solution source to provide regenerated polymer-functionalized particles; and (viii) adding the regenerated polymer-functionalized particles to the feed fluid.

In some embodiments, the method can further comprise repeating steps (ii) to (viii).

In any or all of the above embodiments, the polymer-functionalized particle is (i) a jarosite particle functionalized with a polymer component; or (ii) a polymer-functionalized particle comprising a magnetic core, a shell surrounding the magnetic core comprising a metal-organic framework material, and a polymer component that substantially surrounds the shell.

VII. Examples

Example 1

In this embodiment, a polymer-functionalized nanoscale nNiCo particle was made. 10 mL of a 2% low molecular weight poly(diallyldimethylammonium chloride; polydadmac) solution (20 wt. % in $H_2O$, average $M_w$ 100,000-200,000) containing potassium hexacyanocobaltate(III) (33.3 mg, 0.1 mmol) was combined with a 10 mL aqueous polymer solution containing nickel nitrate hexahydrate (52.5 mg, 0.18 mM) at room temperature with continuous stirring for 24 hour, resulting in a colloidal suspension of nNiCo. Repeated high centrifugation (at high speed; 13,000 rpm) of reaction mixture and washings with water and methanol, followed by air-drying, resulted in the nNiCo particle functionalized with the polymer component.

Example 2

MIL-101 is a chromium terephthalate-based MOF and comprises a framework formed through the connection of supertetrahydera by corner sharing. The supertetrahydera structure is made of $Cr_3O$ units at the four vertices, which are linked through six terephthalate (1,4-benzenedicarboxylate) linkers forming the edges of tetrahyderon. The MIL-101 nanoparticles were prepared as follows: To a fresh vial of $Cr(NO_3)_3.9H_2O$ (330 mg, 0.82 mmol), terephathalic acid (136.9 mg, 0.82 mmol), 4-methoxy benzoic acid (or benzoic acid) (5.1 mg, 0.033 mmol), and water (25 mL) were added. The resulting heterogeneous solution/suspension was mixed thoroughly and sonicated for 5 minutes at room temperature followed by heating at 180° C. for 4 hours in a Teflon-lined autoclave. The reaction mixture was allowed to cool to room temperature and filtered with a 0.2-micron centrifuge filter to remove the unreacted/recrystallized terephathalic acid. Further high-speed centrifugation of the resulting colloidal suspension left a wet green pellet, which was washed with water three times and then with methanol two times to obtain a pale green, pure nano-MIL-101 powder. This MIL-101 powder can be combined with a solution of magnetite to provide a MIL-101 coated magnetic core nanoparticle or the MIL-101 can be grown on to the magnetite core by completing the above process in the presence of a magnetite solution.

Example 3

In this example, two adsorbing polymers, poly(vinylpyrrolidinone) (or "PVP") and poly(diallyldimethylammonium chloride) (or "polydadmac"), were used as polymer components to modify representative nanoparticles comprising an MOF, namely, MIL-101-containing nanoparticles. To investigate the stability of nano MIL-101 nanoparticles against acid conditions, various stability tests summarized in FIGS. 7 and 8 were conducted. To increase the colloidal stability of nano MIL-101 nanoparticles against acid conditions and as well ionic strength solutions, first, as synthesized stable aqueous nano MIL-101 suspensions were treated with aqueous solutions of adsorbing polymers (PVP and polydadmac). Polymer treated suspensions were then stirred for 5 minutes, subjected to centrifugation at 13500 RPM for a few minutes, resulting in wet pellets of MIL-101 nanoparticles, and then re-suspended in polymer solutions. The obtained pellets of nanoparticles were treated with dilute acid (e.g., 0.1 M HCl). The acid-treated particles were centrifuged at 13500 RPM for few minutes and re-suspended in polymer suspensions. The obtained suspension colloidal stability was investigated by treating them with certain high ionic strength solutions, namely 1M NaCl, 1M KCl, 0.1 M HCl, pH 10 phosphate buffer, and geothermal brine. Results for some embodiments are provided below in Table 1.

Example 4

In this example, MOF-containing particles were functionalized with a polymer component and assessed for colloidal stability after treatment with acidic solutions (e.g., 0.1 M HCl) at room temperature and at temperatures ranging from 70° C. and 95° C. Aqueous nano MIL-101 suspensions were prepared and treated with aqueous solutions of the adsorbing polymers. The polymer-treated suspensions were then

TABLE 1

| Sample No. | Sample | Hydrodynamic Diameter (nm) (SD) | Aggregation Observed |
|---|---|---|---|
| 1 | nMIL-101-Water | 116.3 (33) | No |
| 2 | nMIL-101-Water-0.1M HCl | 2007 | Yes |
| 3 | nMIL-101-Aqueous Polydadmac (1%) | 158 (53) | no |
| 4 | nMIL-101- Polydadmac (1%)-0.1M HCl | 552 | Yes |
| 5 | nMIL-101- Polydadmac (1%)-0.1M HCl-Polydadmac | 267 | No |
| 6 | nMIL-101- Polydadmac (1%)-0.1M HCl-Polydadmac (1%)-1M NaCl | 280 | No |
| 7 | nMIL-101- Polydadmac (1%)-0.1M HCl-Polydadmac (1%)-1M KCl | 270 | No |
| 8 | nMIL-101- Polydadmac (1%)-0.1M HCl-Polydadmac (1%)-0.1M HCl | 175.4 (60) | No |
| 9 | nMIL-101- Polydadmac (1%)-0.1M HCl-Polydadmac (1%)-Geothermal Brine | 340 | No/Partial |
| 10 | nMIL-101- Polydadmac (1%)-0.1M HCl-Polydadmac (1%)- pH 10 Buffer | 269 | No |
| 11 | nMIL-101-pH 10 Phosphate Buffer | 129.2 (47.6) | No |
| 12 | nMIL-101- PVP (1%) | 153 (63) | No |
| 13 | nMIL-101- PVP (1%)-0.1M HCl | 140 (34) | No |
| 14 | nMIL-101- PVP (1%)-0.1M HCl-PVP (1%) | 178 (64) | No |
| 15 | nMIL-101- PVP (1%)-0.1M HCl-PVP (1%) -1M NaCl | 155 (47) | No |
| 16 | nMIL-101- PVP (1%)-0.1M HCl-PVP (1%) -1M KCl | 150 (66) | No |
| 17 | nMIL-101- PVP (1%)-0.1M HCl-PVP (1%) -0.1M HCl | 145 (44) | No |
| 18 | nMIL-101- PVP (1%)-0.1M HCl-PVP (1%) - Geothermal Brine | 230 (55) | No/Partial |
| 19 | nMIL-101- PVP (1%)-0.1M HCl-PVP (1%) - pH 10 Buffer | 154 (49) | No |

Figure 7:
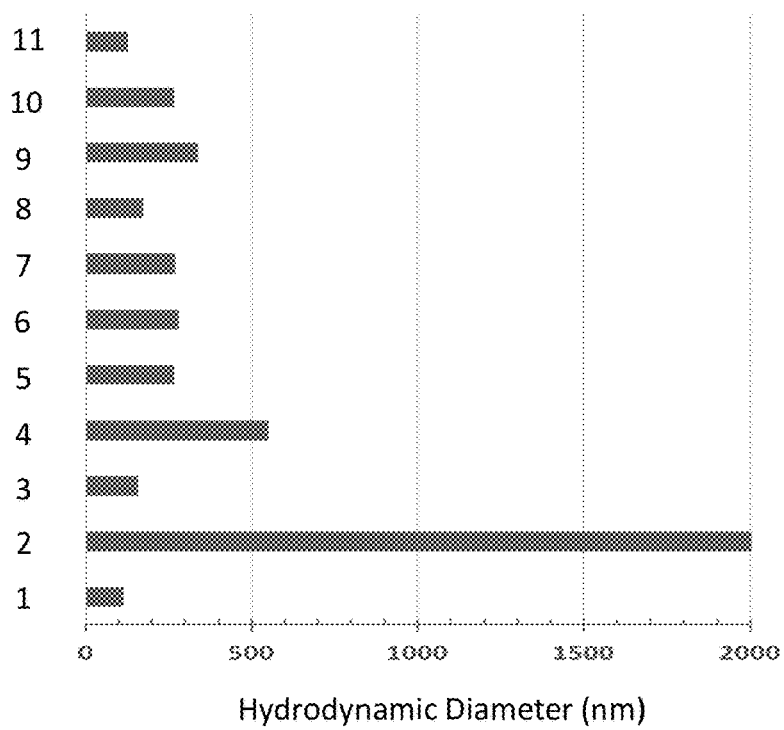
FIG. 7 is a bar graph of hydrodynamic diameters measured for control samples and polymer-functionalized particle embodiments comprising a metal-organic framework (MOF) material and a polydiallyldimethylammonium chloride polymer.
Figure 8:
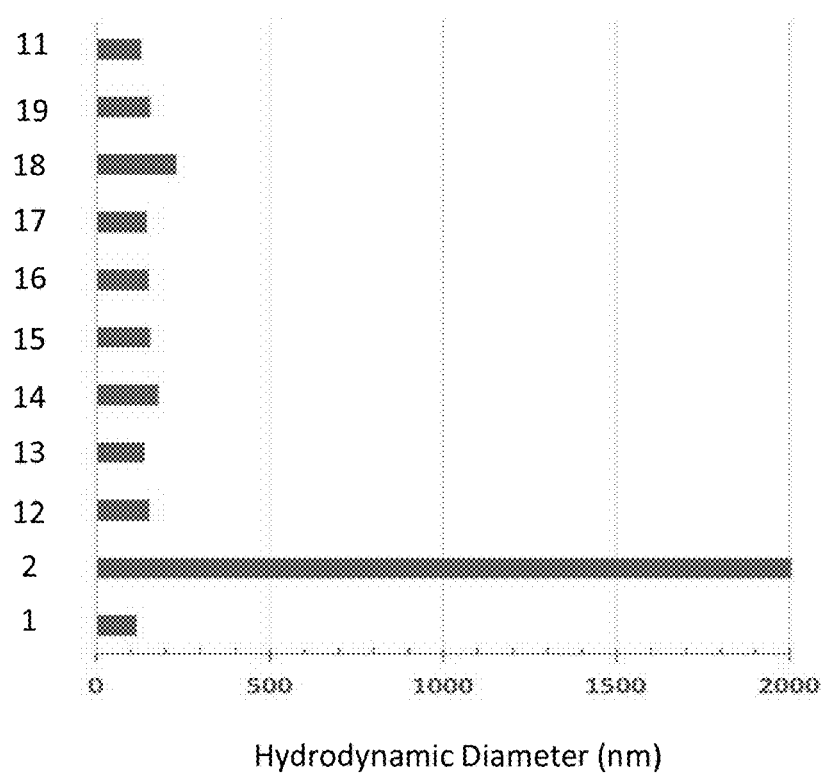
FIG. 8 is a bar graph of hydrodynamic diameters measured for control samples and MOF-containing polymer-functionalized particle embodiments comprising a poly(vinylpyrrolidone) polymer.
Figure 9:
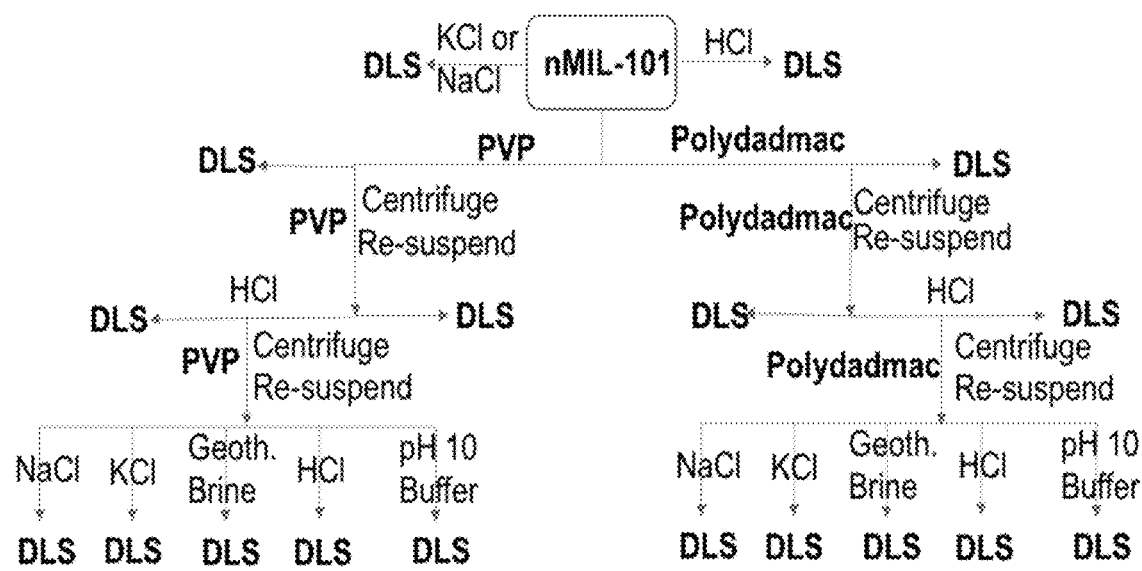
FIG. 9 illustrates a flowchart detailing parameters used to make and evaluate two different polymer-functionalized MOF-containing particle embodiments.

FIGS. 7 and 8 provide graphical representations of the results and of certain polydadmac- and PVP-functionalized nanoparticle embodiments evaluated in this example. The polymer-functionalized nanoparticles are highly stable compared to non-treated nanoparticles. Without being limited to a single theory, it currently is believed that any increase in size of polydadmac-functionalized embodiments could be due to the change in the environment around cationic polydadmac. Interestingly, after high speed centrifugation the both polydadmac- and PVP-acid treated nanoparticles could be easily re-suspended in their respective polymeric solutions. After re-suspending, the size of the polydadmac-functionalized particles went down to 267 nm and PVP-functionalized particles increased slightly to 178 nm. The procedures and conditions used in this example are summarized in FIG. 9.

treated with high ionic strength solutions, including geothermal brine and as well as dilute hydrochloric acid. The reaction mixtures were then heated at 70° C. or 95° C. for 15 minutes. The treated suspensions were allowed to cool to room temperature and hydrodynamic diameter of particles was obtained by DLS (Horiba SZ-100).

Hydrodynamic diameter for freshly synthesized nano MIL-101 without adsorbing polymer is 116 nm. After adding adsorbing polydadmac polymer, the size increased to 158 nm and when PVP was added it went to 153 nm. Table 2 includes colloidal stability results for certain treated suspensions heated at 95° C. When PVP-treated nanoparticles were heated at 95° C. for 15 min, size of nMIL-101 nanoparticles increased slightly from 153 nm to 190 nm. When PVP-treated particles were challenged with high ionic strength solutions and then heated to 95° C., the size of the nanoparticles remained relatively the same (162-194 nm). In some embodiments, when treated with geothermal brine and heated, the particle size increased, but not beyond an acceptable level. Similar trends were observed in some embodiments for the PVP treated samples that were heated at 70° C. (Table 3).

TABLE 2

DLS measurements of nanoparticle suspensions heated at 95° C. for 15 min.

| S. No. | Sample | Hydrodynamic Diameter (nm) | Aggregation Observed |
|---|---|---|---|
| 20 | nMIL-101-PVP (1%)-95° C. | 190 | No |
| 21 | nMIL-101-PVP (1%)-1M NaCl-95° C. | 162 | No |
| 22 | nMIL-101-PVP (1%)-1M KCl-95° C. | 181 | No |
| 23 | nMIL-101-PVP (1%)-0.1M-HCl-95° C. | 194 | No |
| 24 | nMIL-101-PVP (1%)-Geothermal Brine-95° C. | 7871 | Partial |
| 25 | nMIL-101- PVP (1%)-pH 10 Buffer-95° C. | 180 | No |
| 26 | nMIL-101-Polydadmac (1%)-95° C. | 173 | No |
| 27 | nMIL-101-Polydadmac (1%)-1M NaCl-95° C. | 16020 | Yes/Partial |
| 28 | nMIL-101-Polydadmac (1%)-1M KCl-95° C. | 7445 | Yes/Partial |
| 29 | nMIL-101-Polydadmac (1%)-0.1M-HCl-95° C. | 175 | No |
| 30 | nMIL-101-Polydadmac (1%)-Geothermal Brine-95° C. | 3308 | Partial |

TABLE 3

DLS measurements of nanoparticle suspensions heated at 70° C. for 15 min.

| S. No. | Sample | Hydrodynamic Diameter (nm) | Aggregation Observed |
|---|---|---|---|
| 31 | nMIL-101-PVP (1%)-1M NaCl-70° C. | 180 | No |
| 32 | nMIL-101-PVP(1%)-1M KCl-70° C. | 130 | No |
| 33 | nMIL-101-PVP (1%)-0.1M-HCl-70° C. | 158 | No |
| 34 | nMIL-101-Polydadmac (1%)-1M NaCl-70° C. | 5497 | Yes/Partial |
| 35 | nMIL-101-Polydadmac (1%)-1M KCl-70° C. | 9572 | Yes/Partial |
| 36 | nMIL-101-Polydadmac (1%)-0.1M-HCl-70° C. | 217 | No |
| 37 | nMIL-101-Polydadmac (1%)-Geothermal Brine-70° C. | 5114 | Yes/Partial |

Example 5

In this example, the stability of yet additional polymer-functionalized particle embodiments were evaluated (e.g., polymer-functionalized nanoparticles). Three different polymer components were used to functionalize the nanoparticles, specifically PSS, PASS, and a block PEG polymer. The aqueous dispersions of MIL-101 nanoparticles were exposed to 2% aqueous solutions of coordinating polymers. The stability of the polymer-functionalized nanoparticles was assessed (i) at room temperature; (ii) at higher temperatures (e.g., 95° C.); (iii) at room temperature with concurrent exposure to Salton Sea geothermal brine; and (iv) at higher temperatures (e.g., 95° C.) for 5 minutes with concurrent exposure to Salton Sea geothermal brine. The treated suspensions were allowed to cool to room temperature and hydrodynamic diameter of the nanoparticles was obtained by DLS (Horiba SZ-100).

Figure 10:
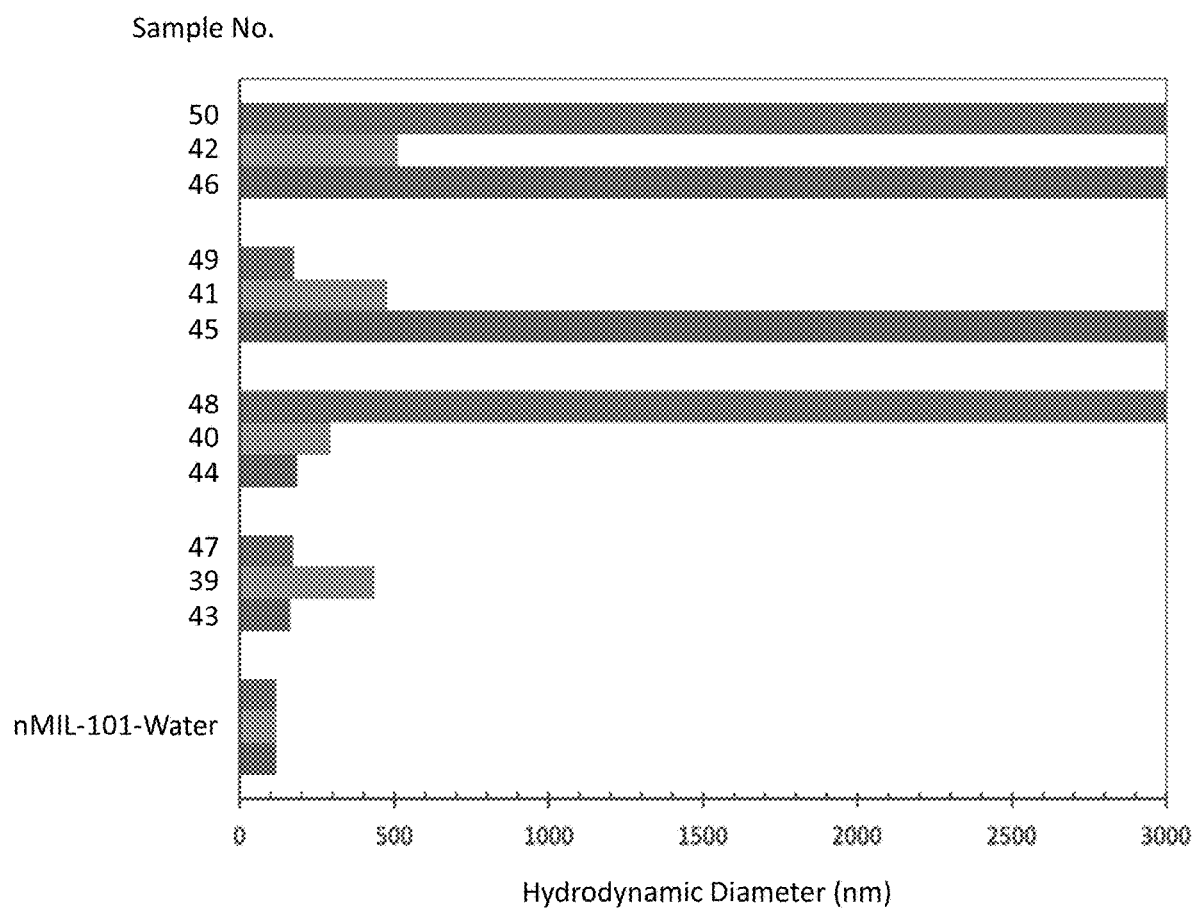
FIG. 10 is a bar graph of hydrodynamic diameters measured under different conditions for polymer-functionalized MOF-containing particle embodiments comprising a poly(sodium 4-styrenesulfonate) polymer, a polyanetholesulfonic acid sodium salt polymer, or a block polyethylene glycol polymer.

The hydrodynamic diameter for freshly synthesized nano MIL-101 nanoparticles without a polymer component was 116 nm. After adding polymer component, the size increased to 435 nm (for PSS embodiments), 164 nm (for PASS embodiments) and 172 nm (for block PEG embodiments). Table 4 and FIG. 10 illustrate the colloidal stability study results for certain polymer-functionalized nanoparticle suspensions heated at 95° C.

When the PSS-functionalized nanoparticles were heated at 95° C. for 5 minutes, the size decreased slightly from 435 nm to 294 nm. When the PSS-functionalized nanoparticles were challenged with Salton Sea geothermal brine at room temperature, the size of the nanoparticles remained relatively the same (e.g., 477 nm). When PSS-polymer treated nanoparticles challenged with geothermal brine and heated (e.g., at 95° C. for 5 minutes), the size remained relatively same (e.g., 510 nm).

For the PASS-functionalized nanoparticles, hydrodynamic diameter increased slightly to 164 nm from 116 nm with addition of the polymer. The size did not change by a significant amount after heating the nanoparticles at 95° C. for 5 minutes (e.g., 187 nm). In some embodiments, certain PASS-functionalized nanoparticles exhibited aggregation when challenged with Salton Sea geothermal brine at room temperature, but exhibited less aggregation in the Salton Sea environment at higher temperatures for five minutes (e.g., 95° C.).

For the block PEG-functionalized nanoparticles, the hydrodynamic diameter increased slightly to 172 nm from 116 nm. In some embodiments, aggregation was observed after heating the nanoparticles at 95° C. In some embodiments, the block PEG-functionalized nanoparticles did not exhibit significant aggregation when challenged with Salton Sea geothermal brine at room temperature. In some embodiments, the block PEG-functionalized nanoparticles exhibited some aggregation when challenged with Salton Sea geothermal brine at high temperatures (e.g., 95° C.).

TABLE 4

DLS measurements of nanoparticle suspensions heated at 95° C. for 15 min.

| S. No. | Sample | Hydrodynamic Diameter (nm) | Aggregation Observed |
|---|---|---|---|
| 38 | nMIL-101 | 116 | No |
| 39 | nMIL-101-PSS (2%)-RT | 435 | No |
| 40 | nMIL-101-PSS (2%)-HT | 294 | No |
| 41 | nMIL-101-PSS (2%)-Geothermal Brine -RT | 477 | No |
| 42 | nMIL-101-PSS (2%)-Geothermal Brine-95° C. | 510 | No |
| 43 | nMIL-101-PASS (2%)-RT | 164 | No |
| 44 | nMIL-101-PASS (2%)-HT | 187 | No |
| 45 | nMIL-101-PASS (2%)-Geothermal Brine -RT | 4685 | Yes |
| 46 | nMIL-101-PASS (2%)-Geothermal Brine-95° C. | 3368 | Yes |
| 47 | nMIL-101-Block PEG (2%)-RT | 172 | No |
| 48 | nMIL-101- Block PEG (2%)-HT | 6888 | Yes |
| 49 | nMIL-101- Block PEG (2%)-Geothermal Brine -RT | 173 | No |
| 50 | nMIL-101- Block PEG (2%)-Geothermal Brine-95° C. | 3748 | Yes |

Example 6

In this example, stability of certain polymer-functionalized nanoparticles was evaluated by measuring dynamic light scattering (DLS) particle size using Horiba, SZ-100 nanoparticle series after subjecting certain particle embodiments to geothermal brine or sodium chloride solutions. Samples for measuring size were prepared by adding 3 ml of 2% aqueous polymer solutions to freshly prepared 0.5 ml of nano MIL-101 suspension followed by 1 ml of water. The nanoparticles were sonicated before adding polymeric solutions. For investigating the stability against geothermal brine or NaCl, 0.5 ml of polymer-functionalized nanoparticles were exposed to 0.5 ml of NaCl or geothermal brine and mixed thoroughly. Stability of nanoparticles were tested against the conditions listed in Table 2. The stability of polymer-functionalized nanoparticles at room temperature and as well at higher temperature (95° C.) was evaluated by heating the particles for 5-30 minutes in Salton Sea geothermal brine or 5 M NaCl and measuring the size by DLS.

TABLE 5

Testing conditions for investing stability of polymer treated nanoparticles

| No. | Conditions Tested |
|---|---|
| A | Nanoparticles in water |
| B | Nanoparticles + polymeric solutions at RT |
| C | Nanoparticles + polymeric solutions + 5M NaCl at RT |
| D | Nanoparticles + polymeric solutions + 5M NaCl at 95° C. |
| E | Nanoparticles + polymeric solutions + Geothermal Brine at RT |
| F | Nanoparticles + polymeric solutions + Geothermal Brine at 95° C. |

Poly(sodium 4-styrenesulfonate; PSS) based polymers and PEI-based polymers with different molecular weights were used to investigate the stability of nano MIL-101 nanoparticles at high temperature (95° C.) against Salton Sea geothermal brine (referred to as "GB" in Table 6). Table 6 illustrates DLS measurements of certain embodiments of the polymer-functionalized nanoparticle suspensions for this example at room temperature (RT) and at 95° C.

TABLE 6

| | Polymeric Component | | | Conditions | | | |
|---|---|---|---|---|---|---|---|
| No. | Polymer + nMIL-101 | M. Wt | Water | NaCl-RT | NaCl-95° C. | GB-RT | GB-95° C. |
| | | | | | Size (nm) | | |
| 51 | No polymer | | 117.38 | 11586 | 10177 | 9263 | 4410 |
| 52 | Polyacrylamide | 40000 | AG | | | | |
| 53 | Poly(sodium 4-styrenesulfonate) | 70,000 | 258 | 260 | 237 | 280 | 383 |
| 54 | Poly(sodium 4-styrenesulfonate) | 200,000 | 630 | 296 | 398 | 428 | 498 |
| 55 | Poly(sodium 4-styrenesulfonate) | 1,000,000 | 6179 | 9701 | 10631 | 7364 | 9693 |
| 56 | Poly(4-styrenesulfoninc acid) ammonium salt | 200000 | 450 | 299 | 264 | 292 | 281 |
| 57 | Poly(4-styrenesulfoninc acid-co-maleic acid) sodium salt | 20,000 | 137 | 210 | 200 | 824 | 2839 |
| 58 | Polyvinyl sulfate-potassium salt | 170,000 | AG | | | | |
| 59 | Poly(2-acrylamido 2-methyl propane)sulfonic acid | 40000 | AG | | | | |
| 60 | Polyethylene imine-Branched | 10000 | 139 | 181 | 194 | 25218 | 14768 |
| 61 | Polyethylene imine-Branched | 1800 | 1248 | 7719 | 6711 | AG | AG |

Figure 11:
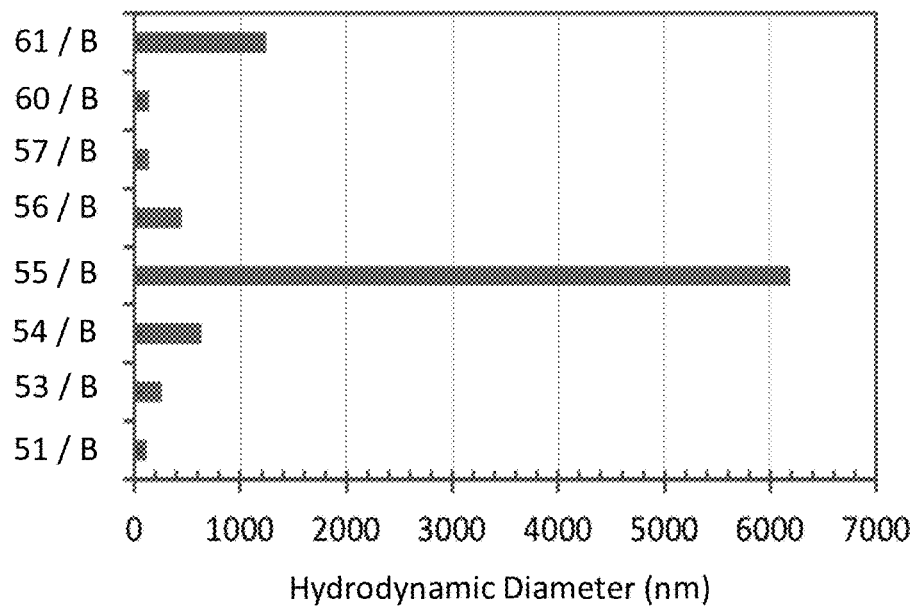
FIG. 11 is a bar graph of hydrodynamic diameters measured under different conditions for polymer-functionalized MOF-containing particle embodiments comprising a poly(sodium 4-styrenesulfonate) polymer, a poly(4-styrenesulfoninc acid-co-maleic acid) sodium salt polymer, a polyethylenimine polymer, or a poly(4-styrenesulfonic acid ammonium salt) polymer under ambient temperature conditions.

FIG. 11 illustrates certain stability results for polymer-functionalized nanoMIL-101 nanoparticles at room temperature ("B" conditions as defined in Table 5). FIG. 11 illustrates that adding PSS polymers and polyethylenimine (PEI) polymers (e.g., PEI branched polymers comprising 25% primary amine, 25% secondary amine and 50% tertiary amine) to nanoMIL-101 produced colloidally stable nanoparticles. In some examples, as the molecular weight of the PSS polymers increased, the hydrodynamic diameter of the nanoparticles increased gradually. In one example, a PSS polymer having an average molecular weight of 1,000,000 was used, which resulted, in some examples, in nanoparticles having an average hydrodynamic diameter of 6500 nm. Other examples having PSS-functionalization having lower average molecular weights, such as 70,000 and 200,000, resulted in smaller average hydrodynamic diameters (e.g., 258 nm and 630 nm, respectively). The PEI-functionalized nanoparticles also exhibited stable suspensions, particularly with PEI polymers having an average molecular weight of 10,000, with some examples having average hydrodynamic diameters ranging around 140 nm. In some examples, low average molecular weights of PEI polymers (e.g., 1,800) resulted in some nanoparticles exhibiting aggregation. Also, in some examples, different sized nanoparticles were obtained using different cationic counterions in combination with the PSS polymer. In one example, nanoparticles treated with poly(4-styrenesulfoninc acid) ammonium salt having an average molecular weight of 200,000 provided nanoparticles having an average hydrodynamic diameter of 450 nm, whereas poly(sodium 4-styrenesulfonate) having an average molecular weight of 200,000 provided nanoparticles having an average hydrodynamic diameter of 630 nm. In yet additional examples, an exemplary polymer comprising a combination of functional groups, such as sulfonic acid and ester groups (e.g., poly(4-styrenesulfoninc acid-co-maleic acid) sodium salt) also provided colloidally stable nanoparticles.

Figure 12:
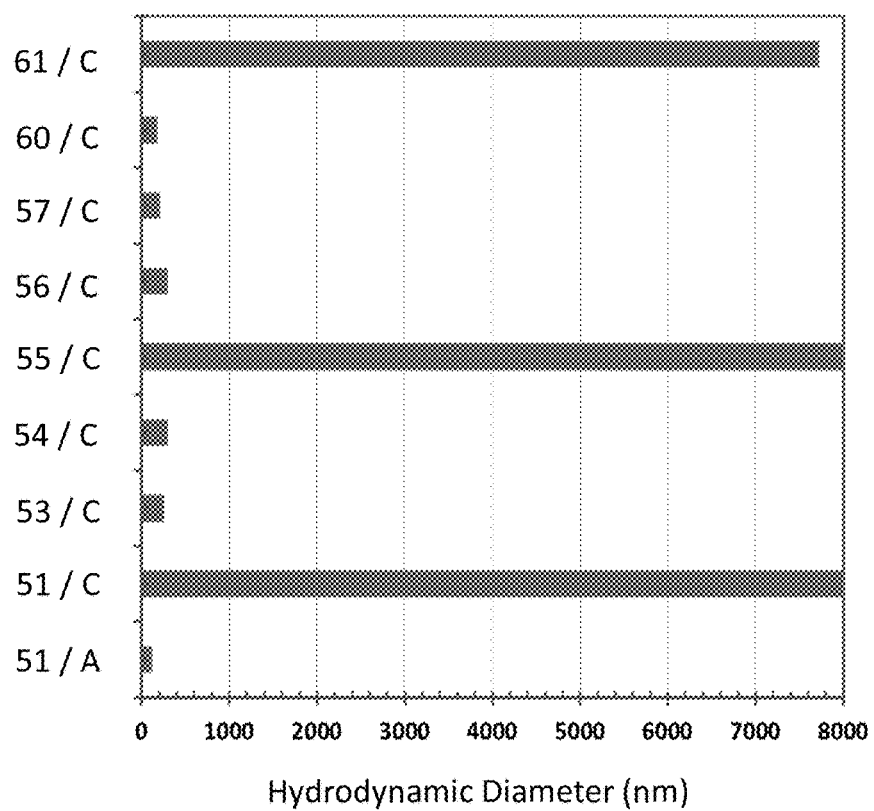
FIG. 12 is a bar graph of hydrodynamic diameters measured under different conditions for polymer-functionalized MOF-containing particle embodiments comprising a poly(sodium 4-styrenesulfonate) polymer, a poly(4-styrenesulfoninc acid-co-maleic acid) sodium salt polymer, a polyethylenimine polymer, or a poly(4-styrenesulfonic acid ammonium salt) polymer after exposure to 5M NaCl at ambient temperature.
Figure 13:
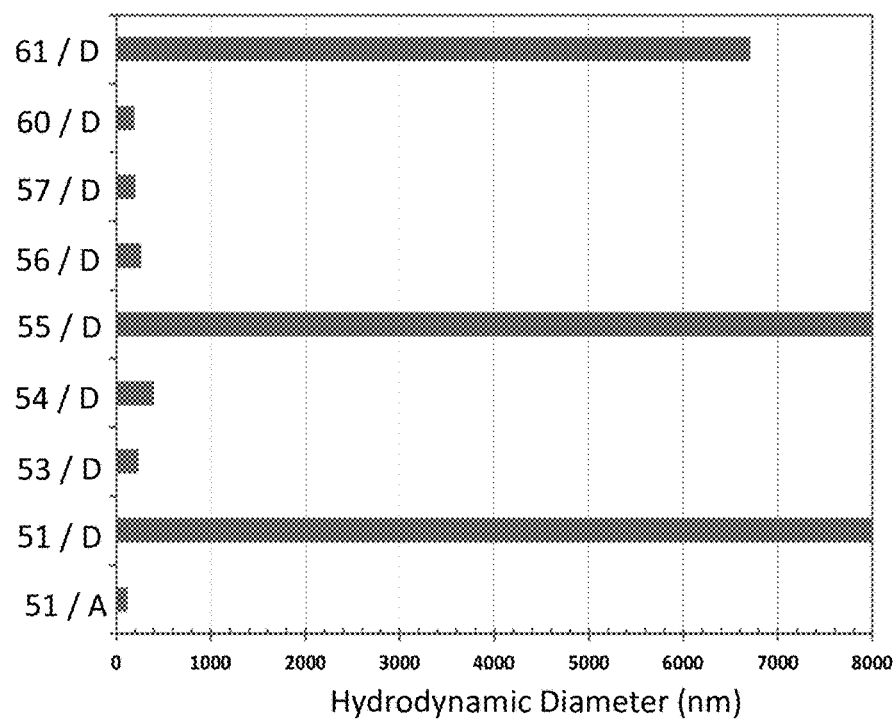
FIG. 13 is a bar graph of hydrodynamic diameters measured under different conditions for polymer-functionalized MOF-containing particle embodiments comprising a poly(sodium 4-styrenesulfonate) polymer, a poly(4-styrenesulfoninc acid-co-maleic acid) sodium salt polymer, a polyethylenimine polymer, or a poly(4-styrenesulfonic acid ammonium salt) polymer after exposure to 5M NaCl at 95° C.

FIGS. 12 and 13 illustrate the stability of exemplary polymer-functionalized nanoMIL-101 nanoparticles after being challenged with 5 M NaCl at room temperature ("C" conditions as defined in Table 5) and as well at 95° C. ("D" conditions as defined in Table 5). As can be seen in FIG. 12, adding 5 M NaCl to polymer-functionalized nanoparticles (e.g., PSS-functionalized and PEI-functionalized nanoparticles) resulted in retention of colloidal stability. The size of the polymer-functionalized nanoparticles did not increase when challenged with 5 M NaCl at 95° C. (see FIG. 13). Nanoparticles functionalized with PEI polymers having an average molecular weight of 10,000 resulted in a stable suspension with hydrodynamic diameters averaging 194 nm.

Figure 14:
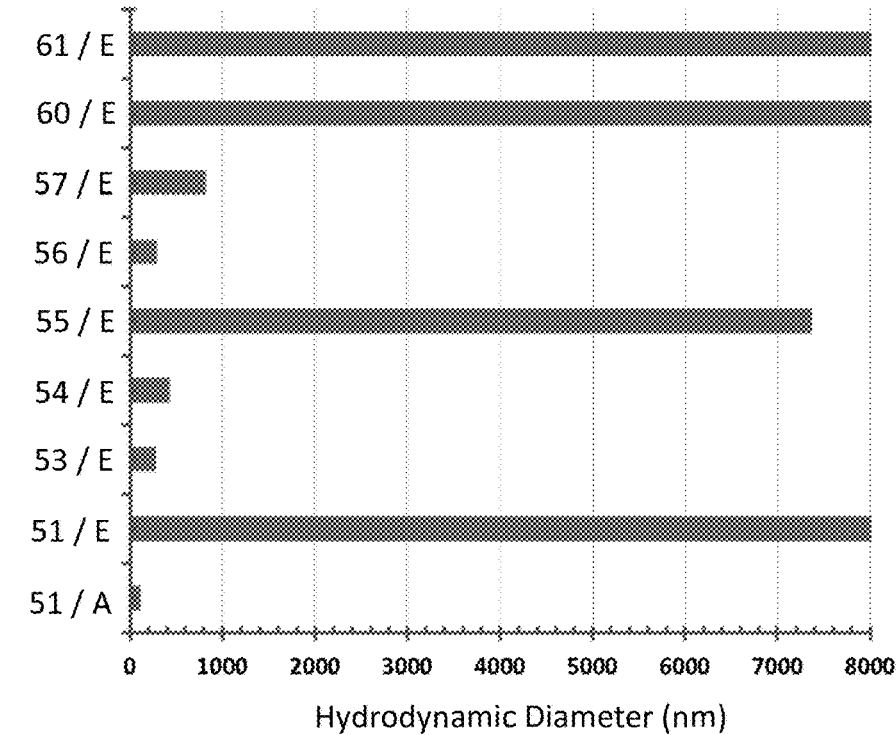
FIG. 14 is a bar graph of hydrodynamic diameters measured under different conditions for polymer-functionalized MOF-containing particle embodiments comprising a poly(sodium 4-styrenesulfonate) polymer, a poly(4-styrenesulfoninc acid-co-maleic acid) sodium salt polymer, a polyethylenimine polymer, or a poly(4-styrenesulfonic acid ammonium salt) polymer after exposure to geothermal brine at ambient temperature.
Figure 15:
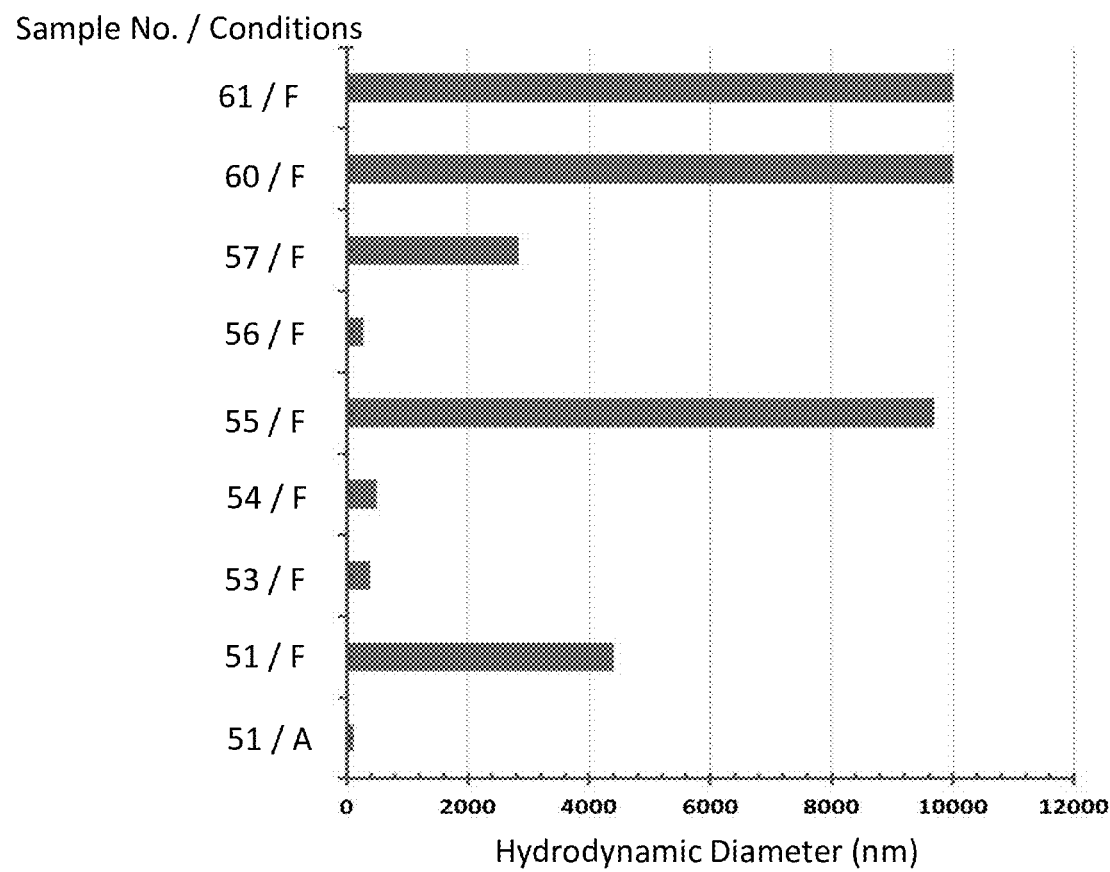
FIG. 15 is a bar graph of hydrodynamic diameters measured under different conditions for polymer-functionalized MOF-containing particle embodiments comprising a poly(sodium 4-styrenesulfonate) polymer, a poly(4-styrenesulfoninc acid-co-maleic acid) sodium salt polymer, a polyethylenimine polymer, or a poly(4-styrenesulfonic acid ammonium salt) polymer after exposure to geothermal brine at 95° C.

FIGS. 14 and 15 illustrate results obtained from analyzing colloidal stability of certain polymer-functionalized nanoparticles after exposure to Salton Sea geothermal brine solutions at room temperature (see FIG. 14, where "E" conditions as defined in Table 5 were used) and as well at 95° C. (see FIG. 15, wherein "F" conditions as defined in Table 5 were used). PSS-functionalized nanoparticles were stable against the geothermal brine even at 95° C.

Example 7

In this example, five different combinations of magnetic field strength and flow rate were evaluated using a representative polymer-functionalized particle embodiment. These different combinations led to different particle retention rates. These are summarized in Table 7. In some examples, when the particle travel time in the radial direction was close to or longer than the time the particle travel in the axial direction, such as in the third entry in Table 7 (magnetic power 17.5 W and flow rate 24 L/h), only 70.8% polymer-functionalized particles were retained.

TABLE 7

| Conditions | Particle Diameter (D, m) | Particle Magnetization ($M_p$, kA/m) | Magnet Magnetization ($M_m$, kA/m) | Linear Velocity (m/s) | Characteristic Length (L, m) | Particle Travel Time in Axis (s) | Particle Travel Time in Radius (s) | Experiment Retention Rate |
|---|---|---|---|---|---|---|---|---|
| 201.3 W + 24 L/h | 1.00E−06 | 300 | 1592 | 1.205 | 1.47E−03 | 0.18 | 0.01 | 99.1% |
| 68.4 W + 24 L/h | 1.00E−06 | 300 | 541 | 1.205 | 1.47E−03 | 0.18 | 0.04 | 95.7% |
| 17.5 W + 24 L/h | 1.00E−06 | 300 | 138 | 1.205 | 1.47E−03 | 0.18 | 0.17 | 70.8% |
| 68.4 W + 13.4 L/h | 1.00E−06 | 300 | 541 | 0.673 | 1.47E−03 | 0.33 | 0.04 | 97.0% |
| 68.4 W + 6.7 L/h | 1.00E−06 | 300 | 541 | 0.337 | 1.47E−03 | 0.65 | 0.04 | 99.5% |

Example 8

In this example, the ability to regenerate a polymer-functionalized particle embodiment was evaluated, specifically particles comprising a DETA-modified In-MOF and a DETA-modified In-MOF further comprising a PSS polymer. Both a static testing system embodiment and a cycling testing system embodiment were used to assess regeneration results. Results for the cycling testing system are provided in Table 8. As can be seen in Table 8, the adsorption capacity of the polymer-functionalized particles can be fully recovered by $NaHCO_3$ treatment regardless of whether the system is run in a batch (static) mode or in a semi-continuous mode.

TABLE 8

| Samples | Before cycling | Right after cycling | After $NaHCO_3$ wash |
|---|---|---|---|
| DETA In-MOF | 88.5% | — | — |
| 36 hours of cycling | — | n/a | >99% |
| 396 hours of cycling | — | n/a | >99% |
| 552 hours of cycling | — | 14.9% | 99.1% |
| DETA In-MOF with PSS | 99.9% | — | — |
| 384 hours of cycling | — | 21.9% | 99.5% |

Figure 16:
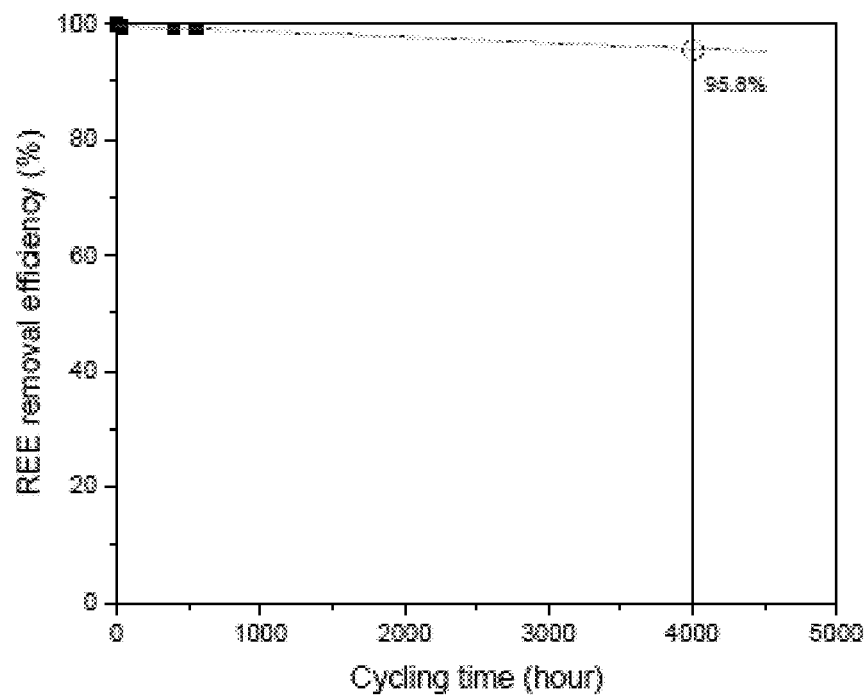
FIG. 16 is a graph showing predicted REE removal efficiency (%) as a function of cycling time (in hours).

There was only a small difference between the adsorbent particles conditioned with different cycling times. Thus, in some embodiments, if a linear degradation is assumed for the polymer-functionalized particles, solute (e.g., REE) removal efficiency will be over 95% after 4000 hours as shown in FIG. 16. As such, it is believed that the lifetime of particular polymer-functionalized particle embodiments can be at least 6,000 hours.

Example 9

Figure 17:
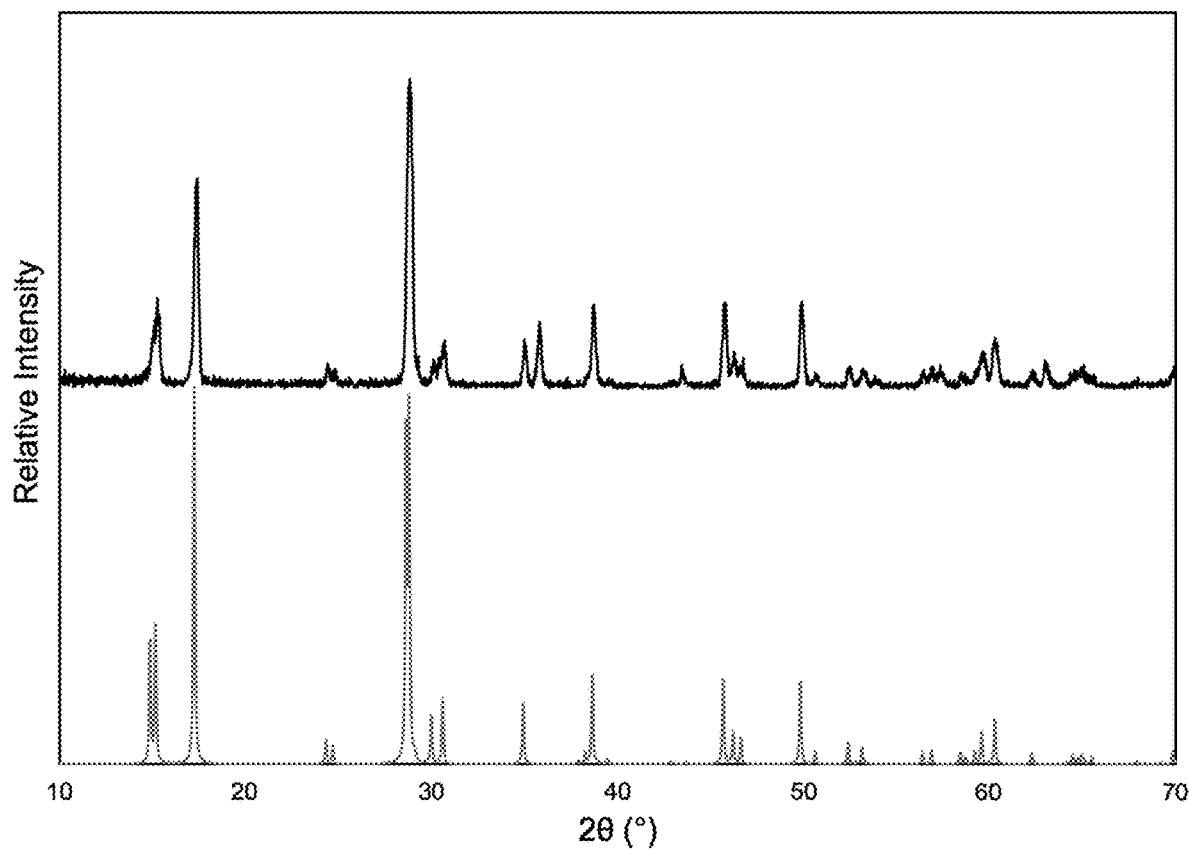
FIG. 17 is a combined powder X-ray diffraction spectrum showing a comparison of peaks obtained from analyzing a jarosite material disclosed herein and simulated peaks; the figure shows that the synthesized jarosite material exhibits peaks that are substantially similar to predicted peaks.

In this example, an ammonium jarosite material was made by combining iron oxide with ammonium persulfate and water and mixing at 150° C. for 12 hours (as summarized below). The synthesized ammonium jarosite was characterized using powder X-ray diffraction analysis and comparing the observed peaks with simulated peaks. See FIG. 17.

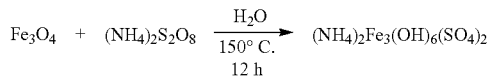

Also, batch extraction experiments were performed by introducing the ammonium jarosite into a known concentration of lithium. Ion-exchange studies were carried out by immersing 15 mg of jarosite into a 5 mL standard solution of a lithium salt in water. Li uptake, and extraction capacity (mg/g), was determined by comparing ICP-OES analysis of blank reference solutions where no ammonium jarosite was present with solution samples extracted after exposure to ammonium jarosite.

In view of the many possible embodiments to which the principles of the present disclosure may be applied, it should be recognized that the illustrated embodiments are only examples of the present disclosure and should not be taken as limiting the scope. Rather, the scope of the invention is defined by the following claims. We therefore claim as our invention all that comes within the scope and spirit of these claims.

We claim:

1. A polymer-functionalized particle, comprising:
a single magnetic core;
a shell surrounding the single magnetic core, wherein the shell comprises a metal-organic framework material; and
a polymer component that substantially surrounds the shell and the single magnetic core;
wherein the polymer component comprises a functional group selected from a sulfonate group, an ester group, an aldehyde group, an amine group, or an amide group.

2. The polymer-functionalized particle of claim 1, wherein the single magnetic core comprises iron or an alloy thereof, nickel or an alloy thereof, an iron oxide or an alloy thereof, a nickel oxide or an alloy thereof, or any combination thereof.

3. The polymer-functionalized particle of claim 1, wherein the single magnetic core comprises iron oxide, cobalt, or nickel.

4. The polymer-functionalized particle of claim 1, further comprising one or more ligand species associated with the shell.

5. The polymer-functionalized particle of claim 1, wherein the polymer component is a sulfonate-containing polymer or an amine-containing polymer.

6. The polymer-functionalized particle of claim 1, wherein the polymer component is poly(4-styrenesulfonic acid) sodium salt or poly(4-styrenesulfonic acid) ammonium salt.

7. The polymer-functionalized particle of claim 1, wherein the polymer component is a polyethyleneimine polymer having an average molecular weight ranging from 8,000 to 12,000.

8. The polymer-functionalized particle of claim 7, wherein the polyethyleneimine polymer comprises 25% primary amine groups, 25% secondary amine groups, and 50% tertiary amine groups.

9. The polymer-functionalized particle of claim 1, wherein the metal-organic framework material comprises chromium, terephthalate, and benzoic acid, or a benzoic acid derivative.

10. The polymer-functionalized particle of claim 1, wherein the polymer-functionalized particle exhibits colloidal stability in a solution having a pH ranging from 4 to 10, such that a hydrodynamic diameter of the polymer-functionalized particle, and/or an average hydrodynamic diameter of a plurality of polymer-functionalized particles, does not change by 45% or more as compared to a hydrodynamic diameter of an identical particle without the polymer component, and/or an average hydrodynamic diameter of a plurality of identical particles without the polymer component.

11. A system, comprising:
a fluid feed zone comprising a feed source comprising the polymer-functionalized particle of claim 1, one or more valves, and a residence tube component;
a magnetic separation zone comprising one or more valves and two or more magnetic separation devices, wherein each magnetic separation device comprises (i) a flow tube having a hollow interior; (ii) a collection component positioned within the hollow interior of the flow tube; (iii) a collection matrix material attached to a portion of the collection component; an electromagnet comprising two magnets, wherein the flow tube is positioned between the two magnets;
a solute isolation zone, comprising a mixer, one or more separator components, and a filter;
a magnetic particle regeneration zone, comprising an aqueous salt solution source, one or more mixers, a separator component, and one or more pumps; and
a stripping fluid flow loop, comprising a stripping fluid source, one or more holding tanks, and a pump.

12. The system of claim 11, wherein (i) the fluid feed zone and the stripping fluid flow loop are fluidly coupled to the magnetic separation zone; (ii) the magnetic separation zone is fluidly coupled to the solute isolation zone; (iii) the solute isolation zone is fluidly coupled to the stripping fluid flow loop and the magnetic particle regeneration zone, which is fluidly coupled to the fluid feed zone.

13. A method for making the polymer-functionalized particle of claim 1, comprising combining a polymer component solution and a pre-made particle comprising (i) a single magnetic core and (ii) a shell comprising a metal-organic framework material that surrounds the single magnetic core, wherein the polymer component solution comprises a polymer component having a functional group selected from a sulfonate group, and ester group, an aldehyde group, an amine group, or an amide group.

14. A method, comprising:
(i) introducing a feed fluid comprising the polymer-functionalized particle according to claim 1 into a system;
wherein the system comprises
a fluid feed zone comprising a feed source, one or more valves, and a residence tube component;

a magnetic separation zone comprising one or more valves and two or more magnetic separation devices, wherein each magnetic separation device comprises (i) a flowtube having a hollow interior; (ii) a collection component positioned within the hollow interior of the flowtube; (iii) a collection matrix material attached to a portion of the collection component;

and an electromagnet comprising two magnets, wherein the flowtube is positioned between the two magnets;

a solute isolation zone, comprising a mixer, one or more separator components, and a filter;

a magnetic particle regeneration zone, comprising an aqueous salt solution source, one or more mixers, a separator component, and one or more pumps; and a stripping fluid flow loop, comprising a stripping fluid source, one or more holding tanks, and a pump;

(ii) applying a magnetic field to at least one of the magnetic separation devices of the system as the feed fluid passes through one or more of the magnetic separation devices;

(iii) turning off the magnetic field;

(iv) passing a stripping fluid provided by the stripping fluid source through one or more of the magnetic separation devices;

(v) separating the polymer-functionalized particles from any solutes freed from the polymer-functionalized particles by the stripping fluid;

(vi) isolating the solutes;

(vii) exposing the polymer-functionalized particles to an aqueous salt solution provided by the aqueous salt solution source to provide regenerated polymer-functionalized particles; and (viii) adding the regenerated polymer-functionalized particles to the feed fluid.

15. The method of claim 14, further comprising repeating steps (ii) to (viii).

* * * * *